United States Patent [19]

Dent

[11] Patent Number: 5,894,473

[45] Date of Patent: Apr. 13, 1999

[54] MULTIPLE ACCESS COMMUNICATIONS SYSTEM AND METHOD USING CODE AND TIME DIVISION

[75] Inventor: Paul W. Dent, Stehags, Sweden

[73] Assignee: Ericsson Inc., Research Triangle Park, N.C.

[21] Appl. No.: 08/608,811

[22] Filed: Feb. 29, 1996

[51] Int. Cl.$^6$ .................................................. H04J 13/00
[52] U.S. Cl. .......................... 370/342; 370/320; 370/335; 370/337; 370/441; 375/200; 455/450
[58] Field of Search ................................. 370/319, 209, 370/329, 330, 335, 337, 342, 320, 441; 375/200, 296; 455/63, 450, 501, 436, 454; 380/34, 37

[56] References Cited

U.S. PATENT DOCUMENTS

| | | | |
|---|---|---|---|
| 5,048,059 | 9/1991 | Dent | 375/94 |
| 5,151,916 | 9/1992 | Dent | 370/209 |
| 5,151,919 | 9/1992 | Dent | 375/1 |
| 5,218,619 | 6/1993 | Dent | 370/209 |
| 5,237,586 | 8/1993 | Bottomley | 370/209 |
| 5,239,557 | 8/1993 | Dent | 375/1 |
| 5,295,152 | 3/1994 | Gudmundson et al. | 375/1 |
| 5,345,598 | 9/1994 | Dent | 455/54.1 |
| 5,353,352 | 10/1994 | Dent et al. | 380/37 |
| 5,357,454 | 10/1994 | Dent | 364/727 |
| 5,375,140 | 12/1994 | Bustamante et al. | 370/335 |
| 5,533,014 | 7/1996 | Willars et al. | 370/335 |
| 5,585,850 | 12/1996 | Schwaller | 455/454 |
| 5,615,209 | 3/1997 | Bottomley | 375/200 |
| 5,638,361 | 6/1997 | Ohlson et al. | 370/342 |

FOREIGN PATENT DOCUMENTS

| | | | |
|---|---|---|---|
| WO94/29981 | 12/1994 | WIPO | H04J 13/00 |
| WO95/05036 | 2/1995 | WIPO | H04B 1/16 |

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

A multiple access communication system and method using Code Division Multiple Access (CDMA) and Time Division Multiple Access (TDMA) comprises coding information signals with CDMA codewords to be transmitted over a common frequency spectrum, time compressing the CDMA codewords for transmission only during allocated timeslots, activating a receiver only during the allocated timeslots to receive and decompress the time compressed CDMA codewords, and decoding the decompressed CDMA codewords to recover the information signals.

35 Claims, 13 Drawing Sheets

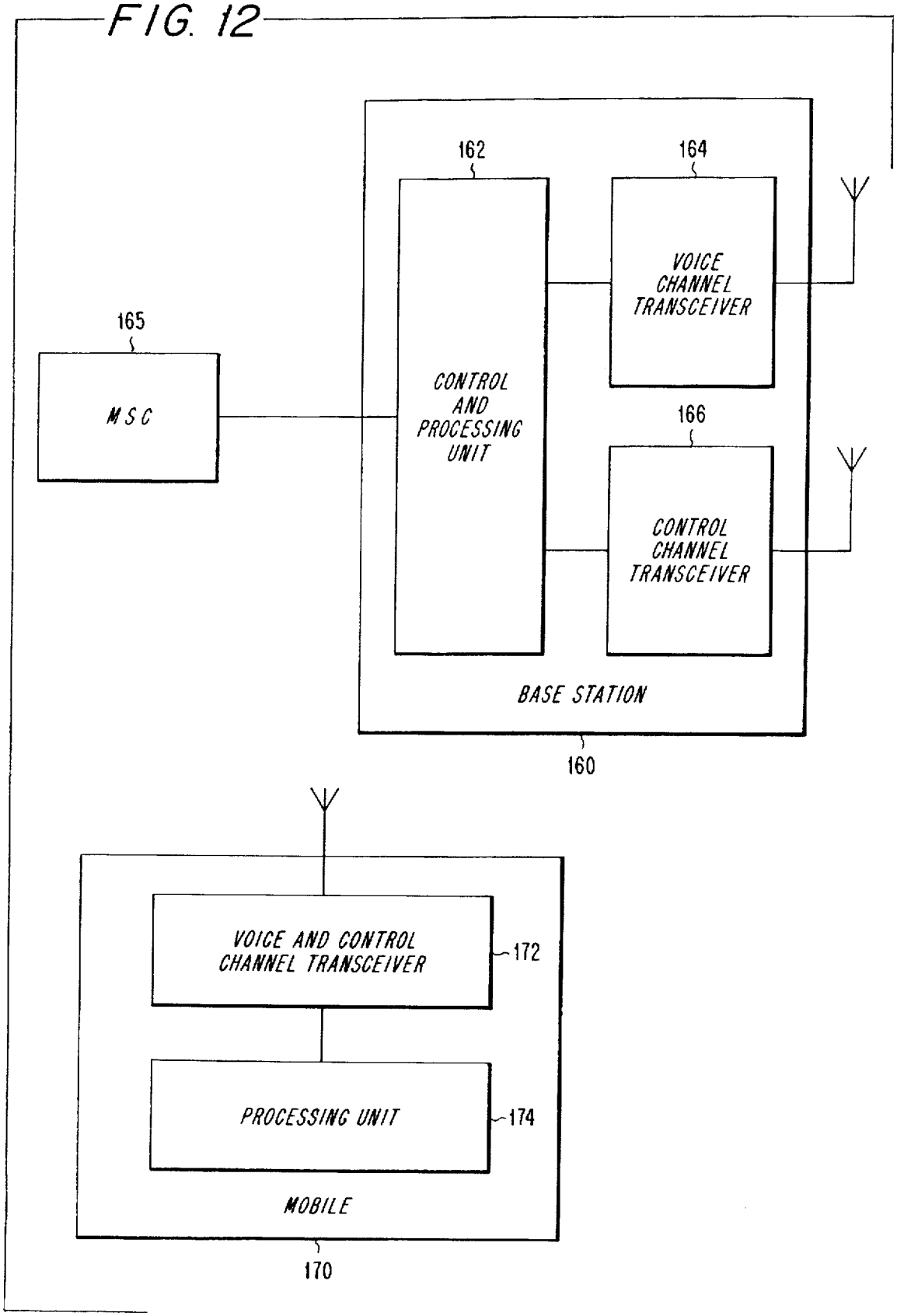

MULTIPLE ACCESS COMMUNICATIONS SYSTEM AND METHOD USING CODE AND TIME DIVISION

BACKGROUND

The present invention relates generally to Code Division Multiple Access (CDMA) communication systems and more particularly to radio communication systems such as cellular, satellite or Personal Communications Networks which use both CDMA and Time Division Multiple Access (TDMA) for transmission. The invention may also be applied to other transmission media such as wireline Local Area Networks where it is desired to support many simultaneous communications links between subscribers on the network.

It is well known in the art that CDMA techniques may be used to transmit many independent signals that overlap in the same frequency spectrum. CDMA comprises coding information bits with a high degree of redundancy such that a much greater number of bits, known as "chips", are obtained for transmission.

The simplest form of redundancy comprises repeating a data bit many times, but CDMA comprises further the pseudo-random alternation of the sign or polarity of each of the repetitions using a code known to both transmitter and receiver. Reception of such a signal comprises undoing the sign alternations using a local replica of the code, and then combining the repeated bits using, for example, majority vote. Since an unwanted, overlapping and potentially interfering signal having a different sign alternation pattern will not be restored to repeated bits of like sign when the signs are undone with an incorrect code, such interfering signals will give, in principle, a net contribution of zero to the majority voting process and will therefore not cause errors.

When other signals having incorrect codes give exactly zero contribution to the majority vote process, that is, after undoing the sign alternation of a wanted signal the unwanted signals have exactly half their repeated bits of opposite sign to the other half, then such signals are called "orthogonal".

Orthogonal codes may alternatively be employed for coding a block of N data bits together to produce a representative block codeword having 2 to the power N-1 or N bits. Such codes are called "bi-orthogonal" and "orthogonal" block codes, respectively. When orthogonal or bi-orthogonal codes are used to discriminate between different transmitted data bit blocks from the same transmitter, they cannot also be used to discriminate between different transmitters. All or part of the power of the code may be used to code data bits from the same transmitter and then the remaining power may be used to discriminate between different transmitters. Telecommunications Industry Association (TIA) standard IS95 is an example of using orthogonal codes to discriminate between different data bit blocks (the IS95 uplink) and also using orthogonal codes to discriminate between different transmissions (the IS95 downlink).

Unfortunately, the number of available orthogonal codes for constructing a set of orthogonal signals is limited to at most the number of chips employed in the codeword. If a larger number of overlapping signals than that is desired, their codes can not all be mutually orthogonal. Moreover, orthogonality is destroyed by the propagation phenomenon, common in mobile radio propagation, known as multipath propagation or time-dispersion. Multipath propagation results when the path between a transmitter and a receiver comprises reflections from large objects, giving rise to echos with different delays. Codes that remain orthogonal when delayed or time-shifted with respect to each other cannot easily be constructed according to the prior art. Multipath echos that are delayed by one chip period or multiple chip periods are normally referred to as "independent rays".

Multipath echos of delay shorter than one chip period are not received with one or more whole-chip time shifts relative to the unshifted code, but give rise to another phenomenon known as Rayleigh fading. While such echos may only be a fraction of a chip period, they can be delayed by several whole and fractional cycles of the radio carrier frequency, which is generally of much higher frequency than the chip rate and therefore of much shorter wavelength.

These echos may therefore combine constructively or destructively depending on their phase, which can change rapidly due to receiver or transmitter motion. Thus the amplitude of a ray bearing the code shifted by one or more whole chip periods appears to vary randomly in amplitude and phase due to being composed of many smaller rays of delays shorter or longer than the whole number of chip periods.

A signal comprised of echos of various delays that are not necessarily multiples of a chip period can be exactly represented mathematically by a number of rays that are relatively delayed by exact multiples of the chip period, but which are Rayleigh fading in a more or less uncorrelated manner. The mathematical representation in this way can be regarded as collecting all the echos that lie within ±½ a chip period of an exact chip period delay multiple together to determine the amplitude and phase variation of a representative ray with that exact multiple chip delay.

Rayleigh fading, for slow speeds, can cause a ray to fade out for periods too long to be bridged by time-interleaved coding or other countermeasures, causing temporary loss of transmission for short periods and therefore errors in the transmission of information. If the signal can be represented by several rays of different whole-chip delay multiples and fading in an uncorrelated fashion, then the chance of all rays fading out completely is reduced, and fewer errors result. Thus multipath echos of multiple-chip delays can be beneficial in bringing about this so-called "path diversity gain". Unfortunately, as has already been stated, such echos have in the prior art had the disadvantage of denying the benefit of orthogonal codes.

If the chip period is reduced, there is a greater probability that echos will be delayed by one or more chip periods and each chip period will encompass a smaller number of echos in general. Ultimately, each individual echo or delayed path is resolved when the chip period becomes sufficiently short, and since each ray then consists of a single path, it does not exhibit the Rayleigh fading phenomenon. Unfortunately, if the environment encompasses a large number of such rays, receiver complexity to process the signal becomes excessive.

The U.S. military communications system known as JTIDS (Joint Tactical Information Distribution System) is another example of a system employing orthogonal codes to discriminate between different transmitter data blocks, as does the cited TIA standard IS95 in its uplink direction. IS95 transmits 64-bit scrambled codewords each carrying 6 bits of information whereas JTIDS transmits 32-bit scrambled codewords, each carrying 5 bits of information. IS95 transmits codewords in a continuous stream and employs means to counter multipath propagation known as a RAKE receiver, which will be described further below. JTIDS, on the other hand, time-compresses each single codeword for transmission in a single burst, and does not employ a RAKE receiver to combine multipath rays.

JTIDS is not configured as a network of base station each communicating with a plurality of mobile stations, but envisages a plurality of autonomous mobile or fixed stations that communicate directly with each other in pairs.

JTIDS is also not considered to be a direct sequence CDMA system that allows many users to overlap at the same time in the same frequency channel, as the 32,5 orthogonal outer code does not have the power to tolerate significant permanently overlapping interference. Instead, it uses frequency hopping to minimize the probability of clashes with other users. It therefore belongs in the class of frequency hopping spread spectrum systems and not in the class of direct sequence CDMA systems.

Furthermore, JTIDS receivers do not envisage time-expanding received bursts for processing as narrowband CDMA signals, using for example multi-user demodulators such as interference subtraction or joint demodulation, but rather directly process the wideband signal to decode a 32,5 orthogonal codeword to obtain a 5-bit Reed-Solomon symbol. Indeed, as a military system, JTIDS maintains security by keeping the codes of some user groups or pairs secret from other stations, so that compromise of a code would not compromise the security of all communications.

The security doctrine practiced by such military systems therefore prevents or teaches away from the techniques of joint demodulation which can benefit civil communications systems through making all CDMA access codes public.

The RAKE receiver is the name given to a prior art receiver adapted to process signals received via several relatively delayed paths. Such a reception channel is known as a multipath channel, and the different paths may be referred to as rays or echos. The RAKE receiver, together with innovative variations adapted more specifically to the cellular CDMA channel from base station to mobile station, are described in commonly owned U.S. patent application Ser. No. 08/187,062, entitled "A Method and System for Demodulation of CDMA Downlink Signals", filed Jan. 27, 1994, which is hereby incorporated by reference. It is explained therein how a receiver can isolate and then combine individual rays using correlation. If the receiver cannot isolate and combine all rays due to complexity limitations, then those that are not isolated and combined each represent a complete copy of the interfering signal environment, effectively multiplying the number of apparently overlapping interfering signals. Since any CDMA system places limits on the number of independent overlapping and interfering signals that can be tolerated without excessive transmission errors, unutilized echos cause a reduction in the number of signals that can be transmitted, i.e. in the capacity of the system measured in Erlangs per Megahertz per unit area.

U.S. Pat. Nos. 5,151,919 and 5,218,619, respectively entitled "Subtractive demodulation of CDMA signals" and "CDMA Subtractive Demodulation" describe novel means to increase the number of non-orthogonal CDMA signals that can be permitted to overlap, by decoding the strongest of the overlapping signals first and then subtracting it and its echos out before continuing to demodulate the next strongest signal, and so on until a wanted signal is decoded. The two above-cited patents by the same inventor as the present application and assigned to the same assignee are specifically incorporated herein in their entirety by reference.

Using subtractive demodulation according to the three above incorporated patents it can be shown that the amount of computation effort needed in a receiver increases with at least the cube of the chiprate, if the CDMA system is exploited to the full capacity of which it is capable. This means that the benefits of subtractive demodulation are most easily obtained for narrowband, low chiprate CDMA systems, causing low chiprate CDMA systems to exhibit better performance than high chiprate systems that cannot use the subtractive technique due to complexity limitations.

Thus, using the above techniques, it is difficult to simultaneously achieve the advantages of: 1) orthogonality, which is only available in the absence of time dispersion or echos delayed by one or more chip periods; 2) path diversity, which is only obtained when echos delayed by one or more chip periods are present; 3) resolution of individual rays to eliminate Rayleigh fading, only obtained with very high chiprates, on the order of 10 MB/s; and 4) interference subtraction, complexity limited to low chiprates, for example under 300 KB/s.

TIA standard IS95 specifies continuous CDMA transmission using a chiprate of approximately 1 MB/s, and this falls between two methods in being too narrowband to achieve the benefits of eliminating Rayleigh fading on the individual rays while being too high a chiprate and therefore too onerous for a low-cost, low-power mobile station to achieve the benefits of interference subtraction.

One method of extending the benefits of subtractive demodulation to higher chiprates is described in commonly owned co-pending U.S. patent application Ser. No. 08/570,431 entitled "Reorthogonalization of Wideband CDMA Signals", filed Dec. 11, 1995, which is assigned to the same assignee and is hereby incorporated by reference. This application discloses despreading signals in signal strength order to obtain narrowband signals, which are then notched out by zeroizing a frequency domain component using a narrowband notch filter. This technique is also used to null out delayed echos of a signal and subtraction errors by repeating the zeroizing process after first zeroizing other unwanted signals.

The aforedescribed re-orthogonalization principle applied by way of spectral nulling is illustrated in FIGS. 1 and 2. In FIG. 1, a receiver 100 downconverts the received signal, if necessary to a suitable intermediate frequency. The intermediate frequency is then despread using the code C1 of the strongest signal in despreader 101. The narrowband, despread signal is then nulled out in the spectral domain by nulling filter 102. The residual signal is then respread with code C1 in respreader 103 prior to being despread in 104 with code C2, nulling out signal 2 in filter 105 and respreading with C2 in block 106. According to one embodiment, re-orthogonalization of the signal with respect to C1, i.e. by subtracting out again a component that correlates with C1 after having subtracted or nulled out other signals, is shown as a second C1 despreader 107, second nulling filter for C1-correlated components 108 and second C1 respreader 109. After the resubtraction stage represented by blocks 107, 108 and 109, the residual signal can be further processed to extract other signals, and later resubtraction of C2 and C1 for a third time. Indeed resubtraction of any or all of previously subtracted signals may be performed to prevent accumulation of subtraction imperfections that hinder the decoding of weak signals.

FIG. 2 illustrates that some of the signal removal stages can be used for removal of differently-delayed rays of the same signal by using a delayed version $C1_{r-T}$ of the code sequence $C1_r$. Rays are preferably removed in descending signal strength order. For example, assuming ray 1 of signal 1 is the strongest received ray of all; then it is despread in a first stage 91 using Code $C1_r$. The despread components of the rays of the same signal (e.g., signal 1 ray 1, signal 1 ray 2, etc.) may be fed to combiner 95 which may be, for example, a RAKE combiner, that tracks the phase and amplitude of every ray and performs coherent combination with the aid of complex weights to enhance the signal for decoding in decoder 96. Block 95 can alternatively be a selection combiner for selecting for decoding always the strongest ray of signal 1, which, however, should always be arranged to be that removed in stage 91 by using the appropriate code delay $C1_r$, $C1_{r-T}$, etc. in stage 1. Block 92 illustrates that rays of other signals may be despread and removed before a second ray of signal 1 is despread, which is desirable if the other signal rays are stronger than signal 1 ray 2.

Signal ray 2 is despread in stage 93 by using code C1 delayed by T, i.e., the code sequence $C1_{r-T}$ where T is chosen to correspond as closely as possible to the delay of the second strongest ray of signal 1 relative to the strongest ray of signal 1. The despread ray 2 component is fed to combiner 95 before being filtered out from the signal passed to subsequent stages represented by block 94. Block 94 can proceed to despread and remove other rays of signal 1, rays of other signals, or to re-subtract components correlated with any of code $C1_r$, code $C1_{r-T}$ or any other code or delayed code used previously in an earlier signal removal stage.

Wideband re-orthogonalization according to the above disclosure can be carried out by analog filters which are less power-consuming than digital signal processing; however, the number of analog filters that can be practically included in a receiver such as a mobile phone is limited to a much smaller number than could be afforded in a cellular base station for example, and so the technique is more practicable to the CDMA uplink than to the CDMA downlink.

Another practical limitation of wideband CDMA for duplex communications systems is interference between own transmitter and own receiver. Such interference may be prevented in narrowband FDMA, TDMA or CDMA systems by allocating a separate frequency or frequency band for transmission and reception respectively by a portable phone, the transmit/receive frequency allocations being reversed at the base station. The frequency spacing between transmit and receive frequencies is known as the duplex spacing. A typical duplex spacing used is 45 MHz. Unfortunately when wideband CDMA is employed, the duplex spacing may be insufficient in relation to the signal spread bandwidth to prevent the transmitter's spectral tails from extending into the receiver band and thereby causing interference.

The above deficiencies of IS95 and other CDMA systems in hindering the respective benefits of wideband and narrowband CDMA systems from being achieved simultaneously are overcome when practicing exemplary embodiments of the invention that will now be described.

SUMMARY

According to an exemplary embodiment of the invention, information is coded and modulated for transmission onto an appropriate carrier frequency for transmission over the medium such that each signal is spread over a wide bandwidth and overlaps in the frequency domain with other, similar signals. In addition, each transmitter time-compresses the coded signal for transmission only during allocated timeslots in successively repeating frame periods. An exemplary receiver receives a composite signal comprising many overlapping signals and is activated only during allocated receive timeslots to receive and convert said composite signal to a set of complex numerical samples representative of the received, composite signal over each timeslot. The complex numerical samples are stored in a processor memory and are then recalled by a numerical processor which operates to separate out, despread and decode a designated one of said overlapping signals to obtain information transmitted in said allocated timeslot, the processing including, for example, despreading or decoding stronger signals first and eliminating them before decoding the allocated signal. Successive information transmitted in corresponding timeslots in successive frame periods may then be assembled and further processed to reconstruct the original information, which may be a digital speech signal, for example.

BRIEF DESCRIPTION OF THE DRAWINGS

The foregoing and other objects, features and advantages of the present invention will be more readily understood upon reading the following detailed description in conjunction with the drawings in which:

FIG. 12 is a block diagram of an exemplary base station and mobile station.

DETAILED DESCRIPTION

An exemplary system and method in which the respective benefits of wideband and narrowband CDMA systems can be achieved simultaneously will now be described.

Figure 1:
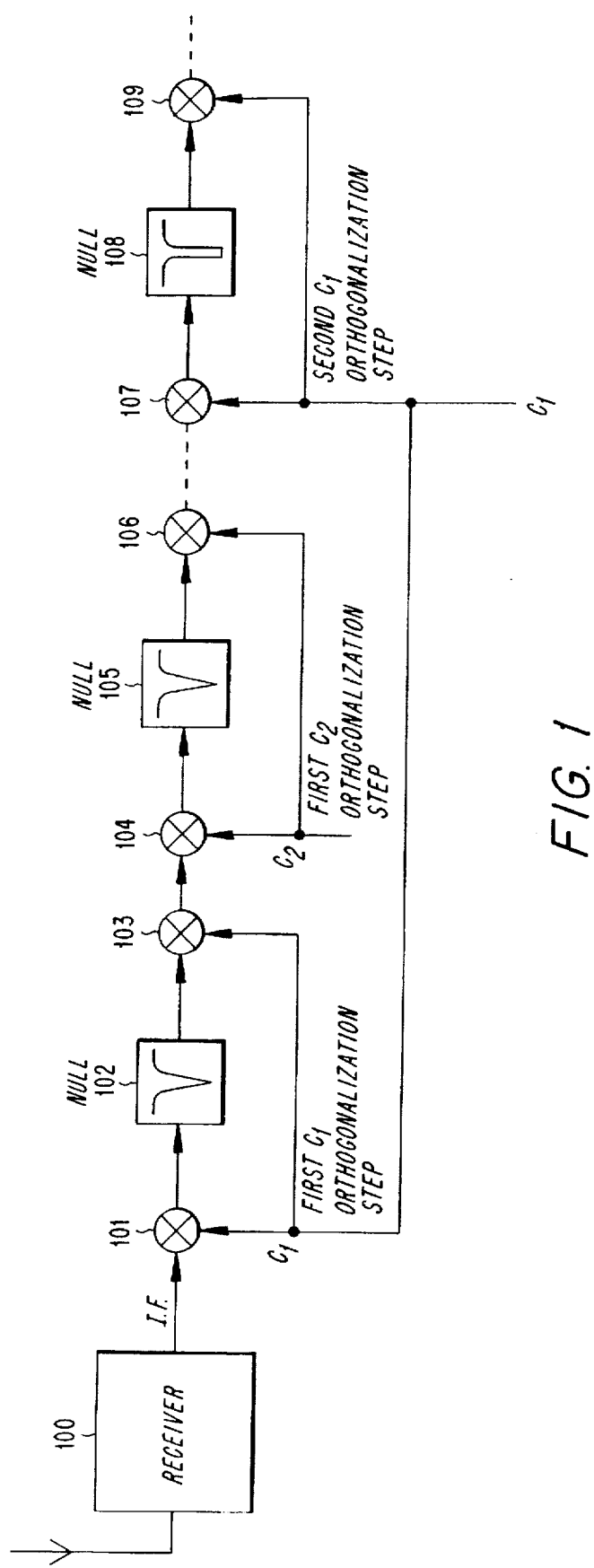
FIG. 1 is a block diagram illustrating re-orthogonalization according to an exemplary embodiment of the invention.
Figure 2:
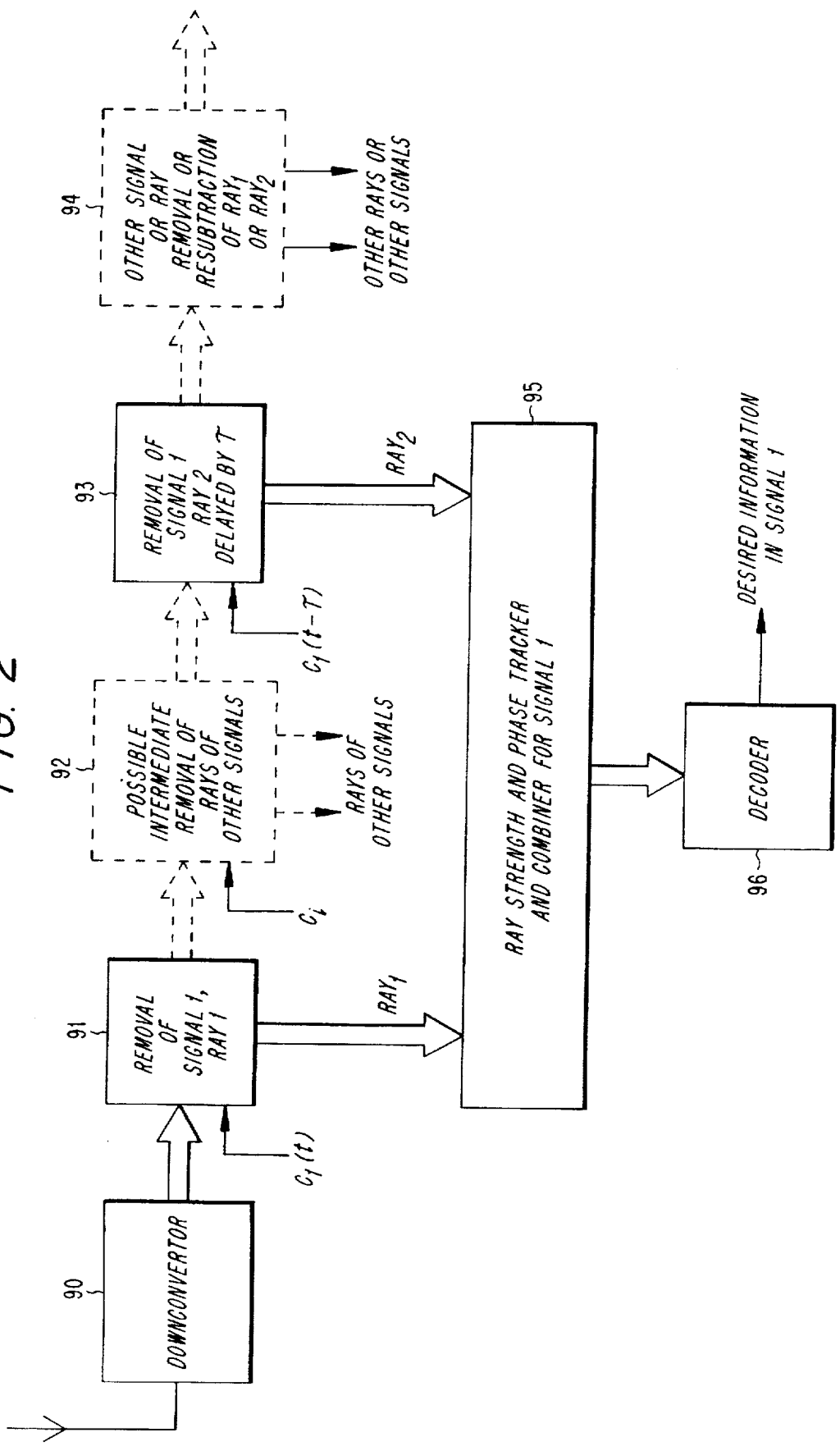
FIG. 2 is a block diagram illustrating removal of delayed signal rays according to an exemplary embodiment of the invention.
Figure 3:
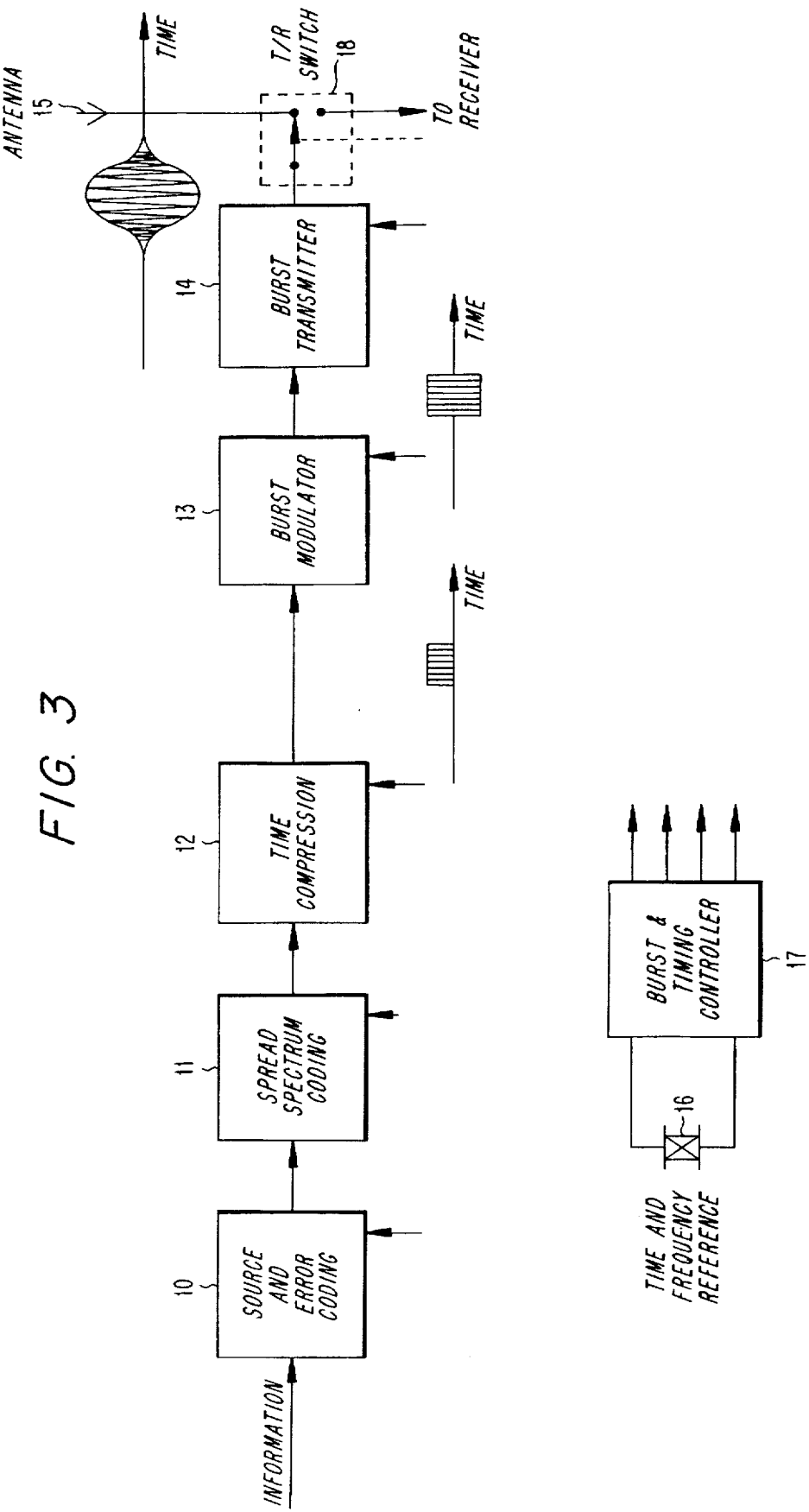
FIG. 3 shows an exemplary transmitter suitable for use with the invention.

FIG. 3 shows an information input connected to a source and error coding device 10. Source and error coding may include such conventional processes as speech digitization using ADPCM, CELP, RELP, VSELP, or sub-band coding, convolutional or Reed-Solomon error correction coding, block coding, and bit or symbol time interleaving.

The digitally coded output of source coder 10 is applied to spread-spectrum coder 11, which preferably uses Walsh- Hadamard block-orthogonal spreading combined with scrambling using an assigned access code, according to the aforementioned U.S. Pat. Ser. No. 5,151,919. The block spreading may be orthogonal or bi-orthogonal. Scrambling may be accomplished by adding a scrambling code to the block code using modulo-2 addition so that the coding is different for each signal. The preferred access codes may be bent sequences, constructed according to U.S. Pat. Ser. No. 5,353,352, entitled "Multiple Access Coding for Radio Communications", which is hereby incorporated by reference.

Spread spectrum coder 11 assembles a number of scrambled code words, preferably at least two Walsh-Hadamard code words, for transmission in a time-compressed burst. The assembled block of codewords is time-compressed using a time-compressor 12 and applied to a radio-frequency carrier using a burst modulator 13. The modulated burst is then converted to a final radio frequency if necessary, amplified to a desired transmit power level, and transmitted by a burst transmitter 14 through an antenna 15. To avoid the possibility of transmission interfering with reception, the transmit burst is preferably staggered in time with respect to a burst received in the opposite direction, such that transmission and reception take place at different times. The antenna 15 may be switched from being connected to the transmitter 14 to being connected to the receiver shown in FIG. 4 by using a transmit/receive switch 18. The transmit/receive switch is operated at the correct times, and the respective processes carried out by elements 10–14 are activated in the correct sequence under control of a burst timing controller 17, which may use an accurate crystal oscillator 16 to generate timing control signals.

Figure 4:
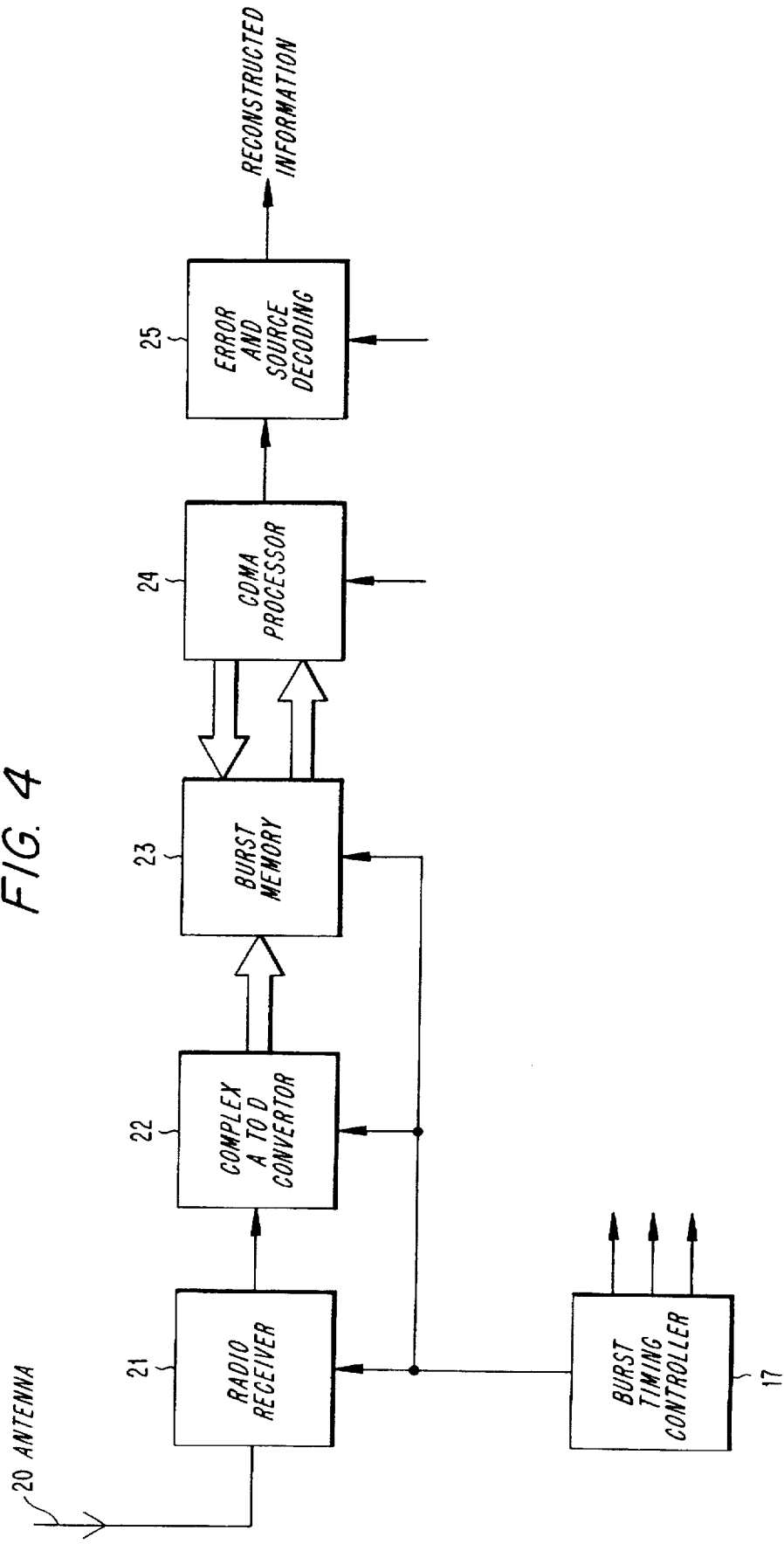
FIG. 4 shows a receiver according to an exemplary embodiment of the invention.

A receiver according to an exemplary embodiment of the invention is shown in FIG. 4. The receiver is preferably activated during an allocated timeslot or timeslots in which a time compressed burst is received. Activation only during allocated timeslots can provide the advantage of reduced power consumption at the receiver. Received signals from the antenna 20 or from a transmit/receive switch are filtered, amplified and downconverted by a radio receiver 21 to a form suitable for digitizing using a complex AtoD convertor 22. Complex AtoD conversion may comprise sampling the signal at a rate at least equal to its bandwidth and converting each sample to a complex number representing the sample's instantaneous phase and amplitude. The complex number may be in Cartesian (X+jY) form or may advantageously be in "logpolar" form according to U.S. Pat. Ser. No. 5,048,059, entitled "Log-polar Signal Processing", which is hereby incorporated by reference.

Converted, complex numerical samples are collected during a designated receive timeslot as determined by the burst controller 17. Thus, the receiver may be selectively activated to receive the time-compressed composite signal only during a selected time slot. The converted, complex numerical samples are then stored in a burst memory device 23 from which they can be retrieved by a CDMA processor 24.

A preferred type of CDMA processor 24 is the subtractive CDMA processor disclosed in the aforementioned incorporated patents (U.S. Pat. Ser. Nos. 5,151,919 and 5,218,619). As described in these patents, in order to optimally decode a coded information signal embedded in many other overlapping signals making up a received composite signal, a radio receiver correlates a unique code corresponding to the signal to be decoded with the composite signal. After each information signal is decoded, it is recorded and removed from the composite signal. As a result, subsequent correlations of other information signals in the received composite signal can be performed with less interference, and therefore, with greater accuracy.

The subtractive demodulation technique is enhanced by decoding the composite signal in an order of the information signals from strongest to weakest signal strength. In other words, the strongest signal is correlated and removed first. Interference caused by the presence of the strongest information signal in the composite signal during the decoding/correlation of weaker signals is thereby removed. Thus, the chances of accurately decoding even the weakest signal are greatly improved. The remainder signal after subtraction is iteratively processed until the desired signal is decoded.

Figure 5A:
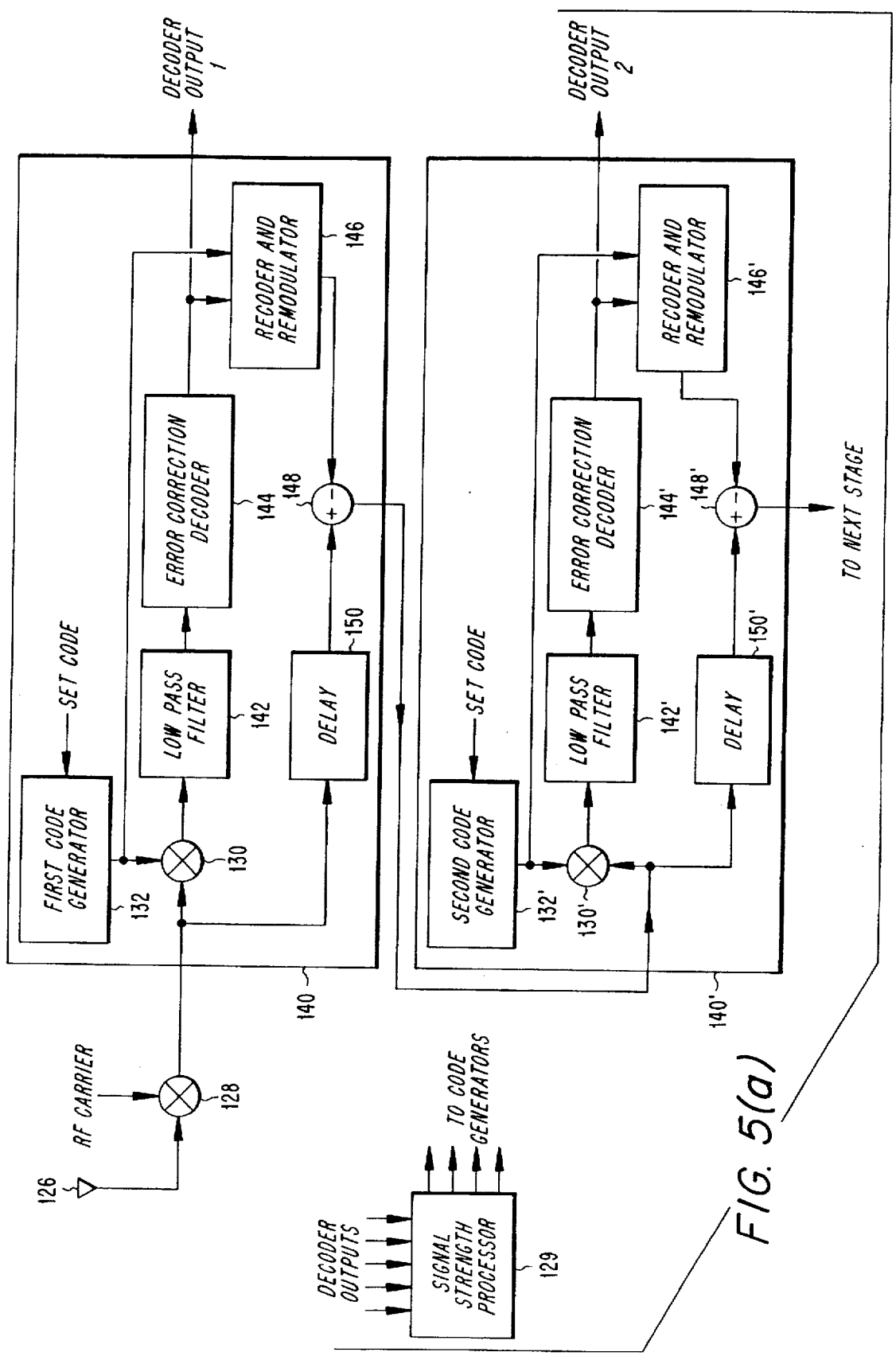
FIG. 5(a) is a block diagram of an exemplary CDMA subtractive demodulator.

FIG. 5(a) shows an exemplary embodiment of a subtractive CDMA processor. In FIG. 5(a) a multiplicity of coded signals overlapping in the same communications channel is received at the antenna 126 as a composite, RF signal. The demodulator 128 converts the received RF signal to a convenient frequency for processing. Such a convenient frequency may, for example, lie around zero frequency (DC), and the composite signal may consist of complex factor components having real and imaginary or I and Q components.

A first digital processing block 140 includes a first code generator 132 set to match the code of the first signal to be demodulated. While the specific code to be set by the code generator 132 in the first data processing block 140 may be selected arbitrarily, in a preferred embodiment, the order in which the codes are generated is based on signal strength. The signal strength of the signals making up the composite signal can be detected by a signal strength processor 129, or can be predicted based upon historical models of signal strength. In the context of cellular systems, if the mobile switching center (MSC) or the base stations (BS) monitors the probable or actual signal strengths of each mobile telephone communication, either the MSC or the BS may perform the tasks of the signal strength processor 129.

Figure 5B:
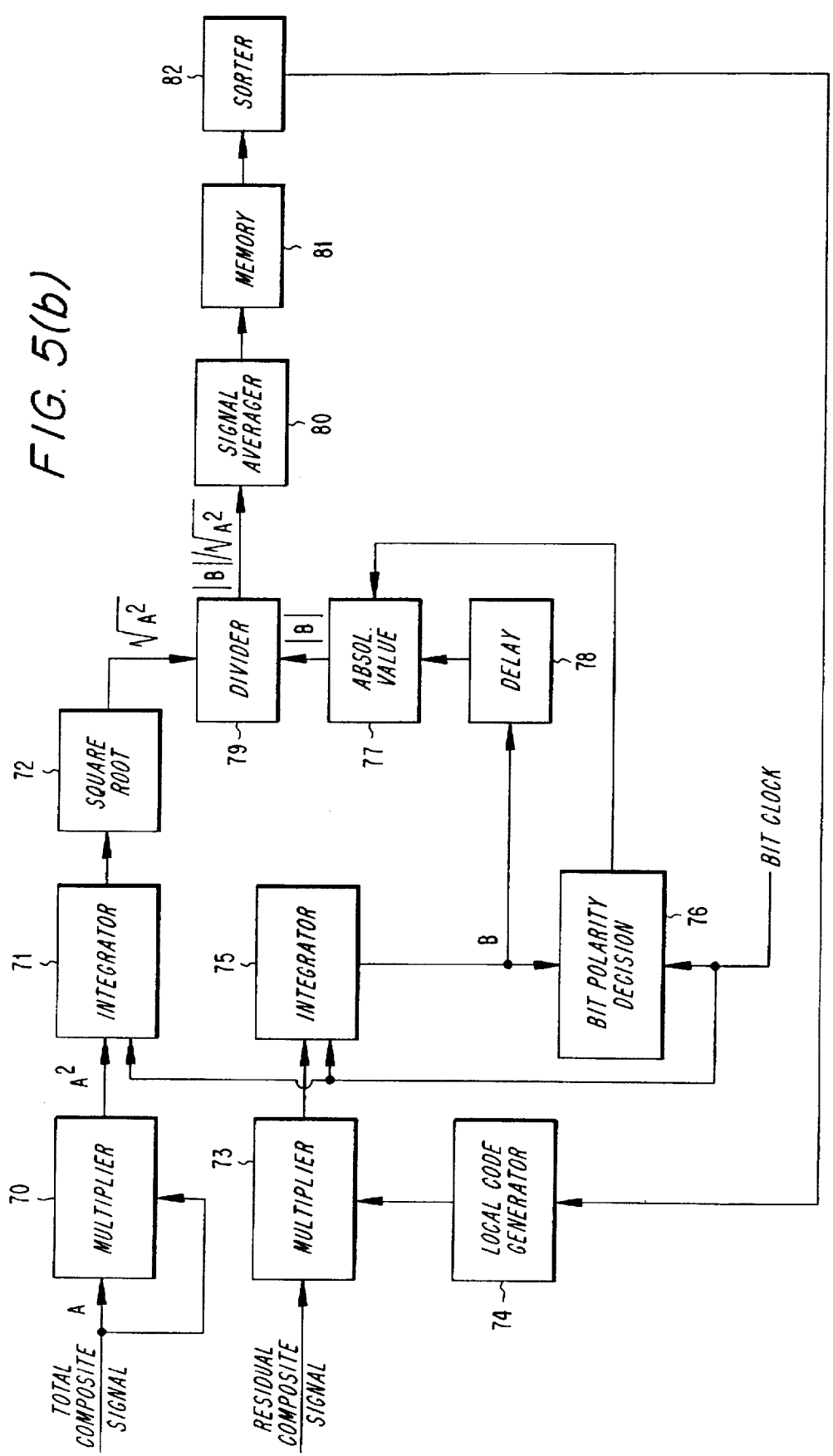
FIG. 5(b) is a block diagram of a signal strength processor according to an exemplary embodiment of the invention.

In an exemplary signal strength processor 129 as shown in FIG. 5(b), to detect a signal strength, the total composite signal received is squared in a multiplier 70 and integrated in an integrator 71 over the number of chip periods in a bit period. A bit clock signal determines the integration interval. A square root circuit 72 determines the root mean square (RMS) value of the composite signal over the bit period.

At the same time, the residual signal is received in a multiplier 73. The residual signal comprises the total composite signal minus any prior decoded signals. The residual signal is multiplied by a spreading code generated by a local code generator 74 of the signal to be decoded. The correlated output signal from the multiplier 73 is also integrated over the same bit period in an integrator 75, as controlled by the bit clock signal. The average or integrated voltage value over the integrated time period may have a positive or a negative polarity. Thus, a bit polarity decision device 76 detects the signal polarity and transmits a signal to an absolute value device 77 which insures that the sign of the integrator 75 output signal, delayed by a delay 78, is always positive. The absolute value device 77 may be, for example, an inverter controlled by the bit polarity decision device 76.

The absolute value of the average correlation signal (B) is divided in a divider 79 by the square root of the RMS value of the total composite signal squared ($A^2$) for the same bit period to generate a normalized value. In other words, the correlation strength of the decoded signal B is normalized by dividing it by the total composite strength of the signal for that bit period. The normalized correlation of the decoded signal is accumulated in a signal averager 80 over a number of bit periods to generate a relative mean strength for that decoded signal. Due to multipath fading of the signal, the actual number of bit periods should probably be on the order of about ten in order to determine an accurate average signal strength of the demodulated signal. Each local code is stored in a memory 81 along with its associated average strength value. A sorter 82 compares each of these average signal strength values and sorts them from strongest to weakest. At that point, the sorter 82 transmits the local spreading code of the strongest signal to the local code generator 74 so that the strongest signal is always demodulated and extracted at the next data bit period. Lesser strength signals are demodulated in order of signal strength as determined by the sorter 82. The sorter 82 functions may be readily implemented by a microprocessor using a software sorting program.

Because the signal strengths of the multiple mobile stations in a cell are constantly varying, linear predictive analysis (LPA) may be advantageously utilized to reorder the signal strength priority. In general terms, a historical model of the relative signal strengths is stored in a memory and used to extrapolate which signal is most likely to have the greatest strength at the next instant in time. LPA postulates that the next value of a waveform will be a weighted sum of previous values with the weight coefficients to be determined. The known Kalman filter algorithm may be used to implement this analysis. In this manner, the strongest signal may be predicted effectively without having to actually perform another sequence of signal decoding and measurements.

If the signal strength processor 129 determines that the actual results of the decoding of the composite signal and signal strength priority sequence is in error because of an inaccurate prediction or because system conditions have changed, the signal strength processor 129 reorders the code sequence to reflect the actual signal strength order. Subsequently, the demodulation process may be repeated to insure that the individually coded signals of the composite signal are decoded in the order of greatest to least signal strength. The repeated process does not result in any loss of data or interruption in traffic because the composite signal is stored in a delay 150 in the processing block 140, as shown in FIG. 5(a). The delay 150 may be simply a memory device. Consequently, the composite signal may be retrospectively reprocessed once the optimum order of decoding is determined.

By correlating the output signal of the first code generator 132 with the composite signal received at the correlator 130, an individual signal corresponding to the first code is extracted from the composite signal. The correlated signal is filtered in a low pass filter 142 in order to reject interference generated by noise and unrelated signals. Instead of the low pass filter 142, a majority vote circuit or an integrate and dump circuit may be used to reduce or despread the bandwidth or bit rate of the correlated signal. The output signal generated by the low pass filter 142 is processed further in an error correction decoder 144 which finally reduces the signal bandwidth or bit rate to the underlying digital information. The decoded, information signal may undergo additional signal processing before it reaches its final destination.

The error corrected output signal is also applied to a recoder/remodulator 146 to reconstruct the waveform of the signal just decoded. The purpose for reconstructing/recoding the decoded signal is to remove it from the composite signal in a subtractor 148. A delay memory 150 stores the composite signal for the processing time required to first decode and then reconstruct the first decoded signal.

The residual composite signal, from which the first signal has been decoded and subtracted, is passed from the subtractor 148 to the input of a second digital processing block 140' similar to the first block 140. The only difference between the two digital processing blocks 140 and 140' is that the code generator 132' is programmed to match the code corresponding to a second signal to be demodulated. In a preferred embodiment, the second signal to be demodulated is the signal having the next greatest signal strength. Those skilled in the art will recognize that the second signal processing block 140' may be implemented by recursive use of the first signal processing block 140 in order to avoid duplicating hardware. The second signal processing block 140' produces a second, decoded signal from the error correction decoder 144' and subtracts a reconstructed, second signal from the delayed composite signal in a subtractor 148'. The residual, composite signal, with two signals now removed, is passed to a third stage of signal processing and so on.

It will be appreciated that a key element of the CDMA subtractive demodulator is that the sequence of demodulation and extraction of individual information signals is in the order of highest signal strength to lowest signal strength. Initially, when the composite signal includes many signals, the signal most likely to be detected accurately is the signal having the greatest signal strength. Weaker signals are less likely to interfere with stronger signals. Once the strongest signal is removed from the composite signal, the next strongest signal may be readily detected without having to account for the interference of the strongest signal. In this fashion, even the weakest signal may be accurately decoded. Because of this enhanced decoding capability, the CDMA subtractive demodulator performs satisfactorily even with a significant increase in the number of users typically handled in conventional CDMA systems. Thus, increased capacity is achieved.

The preferred type of subtractive CDMA process comprises eliminating an already decoded signal by nulling in a spectral domain, such as the Walsh spectrum domain. This may be accomplished using a Fast Walsh Transform circuit according to U.S. Pat. Ser. No. 5,357,454, entitled "Fast Walsh Transform Processor", which is hereby incorporated by reference.

A Walsh Transform is a mathematical operation that converts a set of $M=2^N$ numbers to another set of M numbers by adding and/or subtracting them in predetermined sets of combinations. Each set of combinations comprises, in essence, a summation of all M original numbers, but with their signs selected according to a respective predetermined pattern. M different sets of combinations can be calculated that correspond to M predetermined sign patterns that have the desirable property of being orthogonal, viz., comparing any sign pattern with any other shows like signs in exactly half the positions and unlike signs in the other half.

The mutual orthogonality of the sign patterns makes it possible to decompose the calculation of M combinations of M values into a calculation of $N \times (M/2)$ sums and $N \times (M/2)$ differences, which is a significant reduction in the number of adds and subtracts from $M^2$ to $M \times N$. Such a decomposition is illustrated for a general M-point FWT by a network 10 shown in FIG. 6. It will be appreciated that the FWT has a structure reminiscent of the Fast Fourier Transform, and both algorithms are well known.

Figure 6:
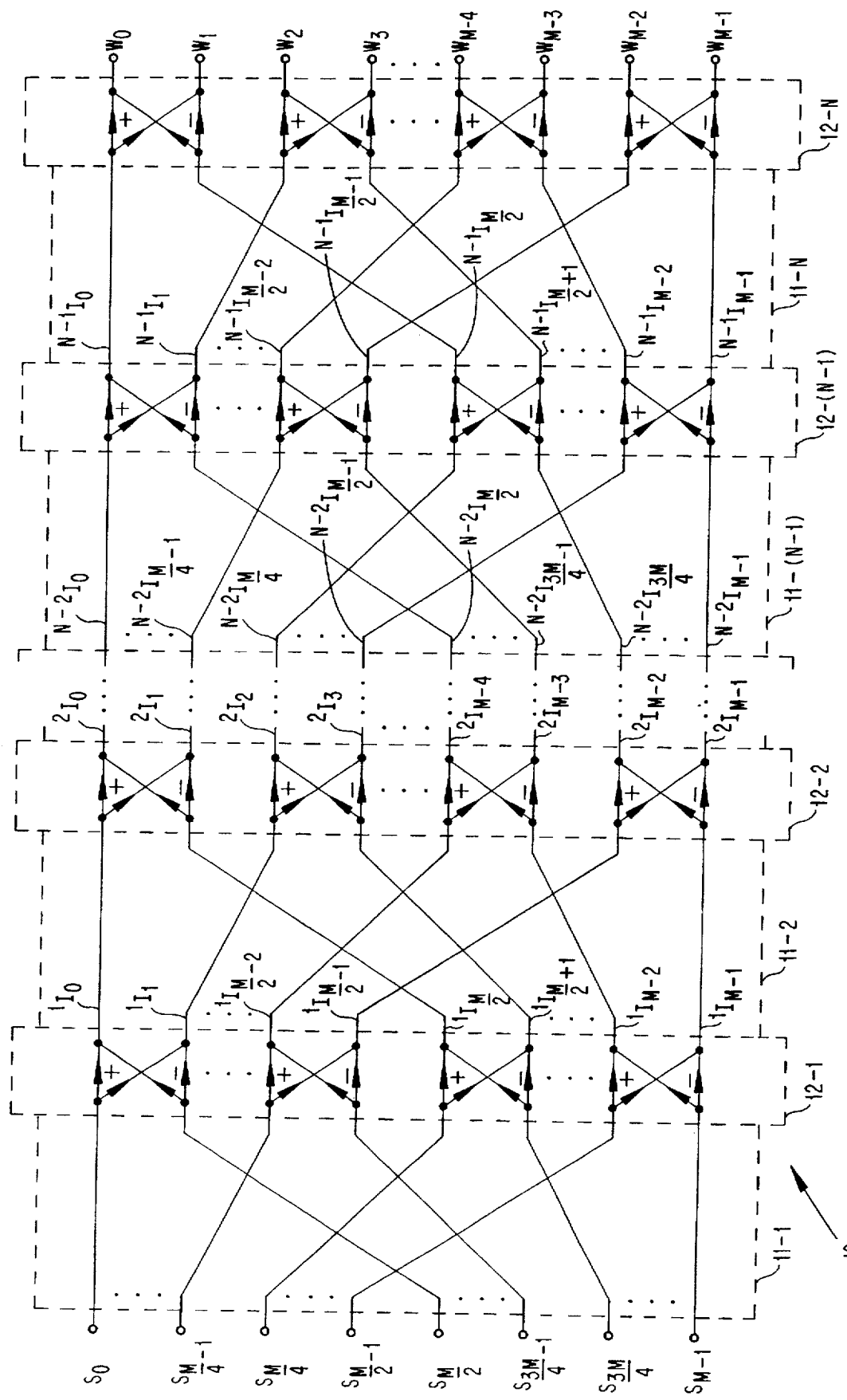
FIG. 6 illustrates an M-point Fast Walsh Transform.

As illustrated in FIG. 6, an efficient structure for carrying out these combinations comprises a processor for generating a Walsh Transform by substantially simultaneously calculating M combinations of M input values wherein $M=2^N$ and the input values are two's-complement binary values. The processor comprises N stages electrically connected in sequence, wherein each stage comprises a criss-cross network of M conductors electrically connected in a predetermined pattern to a set of M/2 butterflies, each butterfly comprising means for calculating a sum and a difference of two respective values presented by its respective criss-cross network and presenting the sum and difference to respective conductors of the next stage's criss-cross network. The input values are presented to the criss-cross network of the first stage serially and least-significant-bit first, and substantially synchronously therewith, the Walsh transform of the input values is serially produced by the butterflies of the N-th stage.

In addition to the Subtractive CDMA processor, the RAKE receiver, described above, is another CDMA processing algorithm which can be employed with exemplary embodiments of present invention. A RAKE receiver uses a form of diversity combining to collect the signal energy from the various received signal paths, i.e., the various signal rays. Diversity provides redundant communication channels so that when some channels fade, communication is still possible over non-fading channels. A coherent CDMA RAKE receiver combats fading by detecting the echo signals individually using a correlation method and adding them algebraically (with the same sign).

In one form of the RAKE receiver, correlation values of the signature sequence with the received signals at different time delays are passed through a tapped delay line. The values stored in the delay line are weighted and then summed to form the combiner output. When the earliest arriving ray correlation is at one end of the tapped delay line and the latest arriving ray correlation is at the other end of the tapped delay line, the weighted sum is selected to give the combined signal value for a particular information symbol period. This is effectively sampling the output of a complex finite impulse response (FIR) filter, whose coefficients are the weights which are referred to as the RAKE tap coefficients.

The conventional RAKE filter was designed, however, assuming white noise, and does not work well when the noise is colored. Accordingly, the conventional RAKE filter is not an optimal solution for a mobile receiver which receives a significant amount of noise which is colored by the channel.

Figure 7:
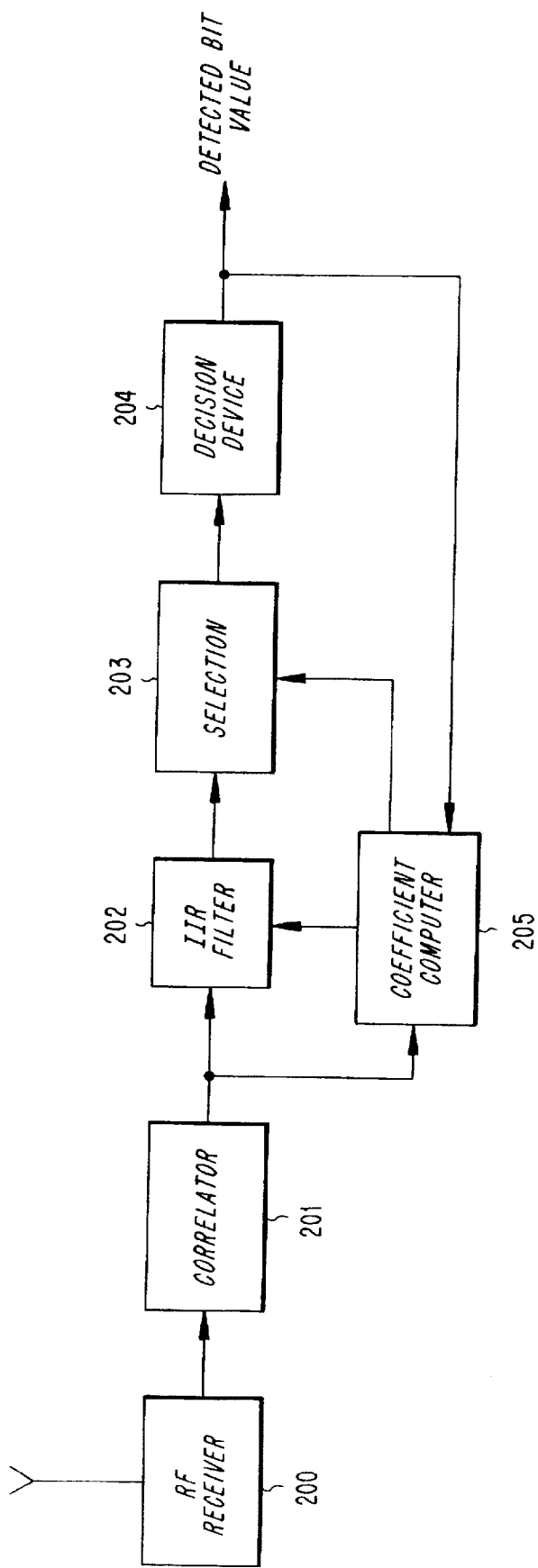
FIG. 7 is a block diagram of a receiver including an IIR filter according to an exemplary embodiment of the invention.

FIG. 7 shows a block diagram of an improved RAKE receiver described in the above-incorporated U.S. patent application Ser. No. 08/187,062 which may be used in conjunction with the present invention. The receiver detects CDMA signals in the presence of colored noise. This is accomplished by replacing the conventional RAKE FIR combining filter with a more general filter, for example an IIR filter. The general filter is also provided with tap locations and tap coefficients that are optimal for the CDMA downlink case. Optimization is based on maximizing the signal-to-noise ratio (SNR) of the detection statistic, taking into account that the pre-channel noise is colored by the same channel as the signal channel. These filter parameters can be determined as a function of communication link parameters. Alternately, the filter parameters can be determined directly using an adaptive filtering approach, eliminating the need to directly estimate the link parameters.

In FIG. 7, a received radio signal is mixed down to baseband and sampled, for example, by mixing it with cosine and sine waveforms and filtering the signal in an RF receiver 200, yielding complex chip samples. The chip samples are correlated to the known signature sequence in the correlator 201. The chip samples can be correlated with the known signature sequence at at least two points shifted in time to determine numerical values related to a phase and an amplitude of at least two multipath rays. Correlation values are filtered by an IIR filter 202. At the appropriate time, based on symbol timing information, the IIR filter output is selected by selector 203, which provides the selected output to a decision device 204, which uses the IIR filter output to determine which information signal is detected. A coefficient computer unit 205 is used to determine the tap coefficients for use in the IIR filter 202. This includes estimation of the channel taps and noise powers, or related quantities.

Another advantage of the inventive combination of CDMA and TDMA by means of timecompressing a narrowband CDMA signal to form a wideband signal arises in the context of systems using only a single frequency band for communications in both directions. If transmission is compressed into a first fraction of a recurring time interval, reception may take place in a second non-overlapping fraction of the time interval thus constituting a time-duplex system whereby alternate transmission and reception take place at the mobile station and base station. The base-station's receive periods can be arranged to coincide with mobile transmit periods and vice-versa. Time-duplex in the same frequency band has the characteristic that the propagation path is likely to be reciprocal if transmission follows reception very closely in time, for example, within 0.5 mS. Thus, the RAKE taps just determined for reception and their historical values from previous reception periods can be processed to determine a precompensation of the transmitter waveform that will provide enhanced communication possibilities taking into account information about the channel gleaned from the receiver.

Those skilled in the art will appreciate that the present invention is not limited to the above-described CDMA processing techniques, but that many other CDMA processing algorithms can be employed with the present invention. Exemplary embodiments of the present invention, by buffering a TDMA/CDMA burst using the memory 23 in order to undo the time compression performed in transmitter block 12, provide the significant advantage of enabling the receive CDMA processing to operate at a slower speed, which allows more sophisticated algorithms, normally only practicable for narrowband CDMA signals, to be implemented also for high chiprate CDMA signals.

To illustrate the advantages of the present invention, the reasons why CDMA receiver processing normally increases in complexity with at least the cube of the chip rate will be outlined.

First, the number of chips or signal samples per second that have to be processed increases in direct proportion to the chiprate when continuous CDMA transmission is employed.

Second, for a given amount of time dispersion in the propagation channel, the number of delayed rays that must be processed using, for example, a RAKE receiver increases in direct proportion to the chiprate.

Third, if the chiprate, and thus occupied bandwidth, is increased, the number of overlapping signals to be processed increases in direct proportion to the bandwidth in order to maintain the same efficiency of spectral utilization. Together, the above three reasons can lead to an 8-fold increase in receiver complexity every time the chiprate is doubled.

Although it can arise that the number of significant rays due to delayed multipath that have to be processed does not increase indefinitely with an increase in chip rate, and indeed levels off when the benefits of individual ray isolation have been achieved and the isolated rays are no longer Rayleigh fading, the number of isolated rays varies significantly between different rural and urban environments. For cases in which the delay spread from earliest ray to latest echo is many chip periods, but the number of significantly strong echos in between the earliest and the latest is manageable, there would be advantages in increasing the chip rate in order to resolve individual rays to thus eliminate the Rayleigh fading on the rays. However, if the capacity advantages of interference subtraction are desired, the complexity of the receiver is increased due to the number of overlapping signals to be decoded and subtracted. The number of chips per second to be processed also increases when conventional, continuous CDMA is employed. Using the inventive time-compressed CDMA/TDMA hybrid scheme according to exemplary embodiments of the invention, however, the chiprate is increased during the burst by time compression without increasing the number of chips or signal samples that a receiver has to process on average.

Moreover, the increase in the number of signals that have to be accommodated in the wider bandwidth in order to maintain spectral utilization efficiency does not result in an increase in the number of overlapping signals, as the additional signals are accommodated in other, non-overlapping timeslots that the receiver does not need to process to decode only its own designated signal. Thus two of the above mentioned factors that normally increase the complexity when chiprates are increased are avoided by using the inventive CDMA/TDMA hybrid according to exemplary embodiments of the present invention.

A further technical advantage of exemplary embodiments of the invention arises in relation to an aspect of receiver design known as channel tracking. Channel tracking refers to establishing at the receiver what phase change and amplitude attenuation the propagation path has applied to each of the rays, so that they can be combined coherently. If the rays exhibit Rayleigh fading, the phase and amplitudes are continuously changing in a random manner and at a speed determined by the Doppler shift determined by the relative transmitter to receiver velocity in wavelengths per second. For radios installed in vehicles moving on the highway at 100 km/hr and operating at wavelengths of 15 cm, each ray can be changing completely at a rate of 280 times per second. It can be technically complex and costly to produce a receiver that faithfully tracks many rays changing at such rates.

Using conventional continuous CDMA, it can also be difficult to separate changes in phase of the signal caused by the underlying information bits at a rate of 2.4 kilobits per second, for example, from the changes caused by movement, when only a decade in frequency (i.e., one order of magnitude) separates the information spectrum from the fading spectrum. At least two decades of spectral separation between information modulation and fading rates are desirable to facilitate demodulation and decoding without loss of performance. When such a CDMA signal is compressed 10:1 in time however, the underlying information rate transmitted in the burst is also increased by a factor of 10 to 24 kilobits per second and at the same time, if the chip rate is high enough, the fast Rayleigh fading modulation on each ray is substantially reduced and replaced by relatively slower changes in the appearance and disappearance of rays due to shadowing or to objects much larger than one wavelength coming in and out of the picture. Thus, the inventive use of time-compressed CDMA can doubly benefit the operation of a per-ray channel tracker by simultaneously increasing the information modulation rate while reducing the fading rate and thus obtaining the desired at least two decades of spectral separation.

Reference is made to the patents incorporated by reference above for more detail on the type of processing CDMA processor 24 can perform on the digitized samples stored in memory 23, and on the operation and use of channel trackers in coherent demodulation or combining of independent multipath rays.

Referring again to FIG. 4, after the CDMA processor 24 has completed processing a signal burst comprised of one or more codewords in any of the ways described above (e.g., RAKE with a channel tracker that does not need any longer to track fast fading, subtractive CDMA demodulation, etc.), its demodulated output is passed to an error and source decoder 25 that performs the inverse process of the source and error coder 10 of FIG. 3 and may include well known processes such as time deinterleaving, convolutional, Reed-Solomon or block error correction decoding and speech decoding using, for example, a RELP or VSELP or a simpler algorithm such as delta-modulation or ADPCM in order to reconstruct an analog speech signal. The coder 10 and corresponding decoder 25 may also or alternatively code digital or text data for transmission, or may code video stills, fax images or moving pictures using digital TV compression algorithms such as JPEG or MPEG, or multi-media combinations of text, sound and images. All such variations in implementation or application of the invention are regarded as falling within the spirit and scope of the present invention.

Figure 8:
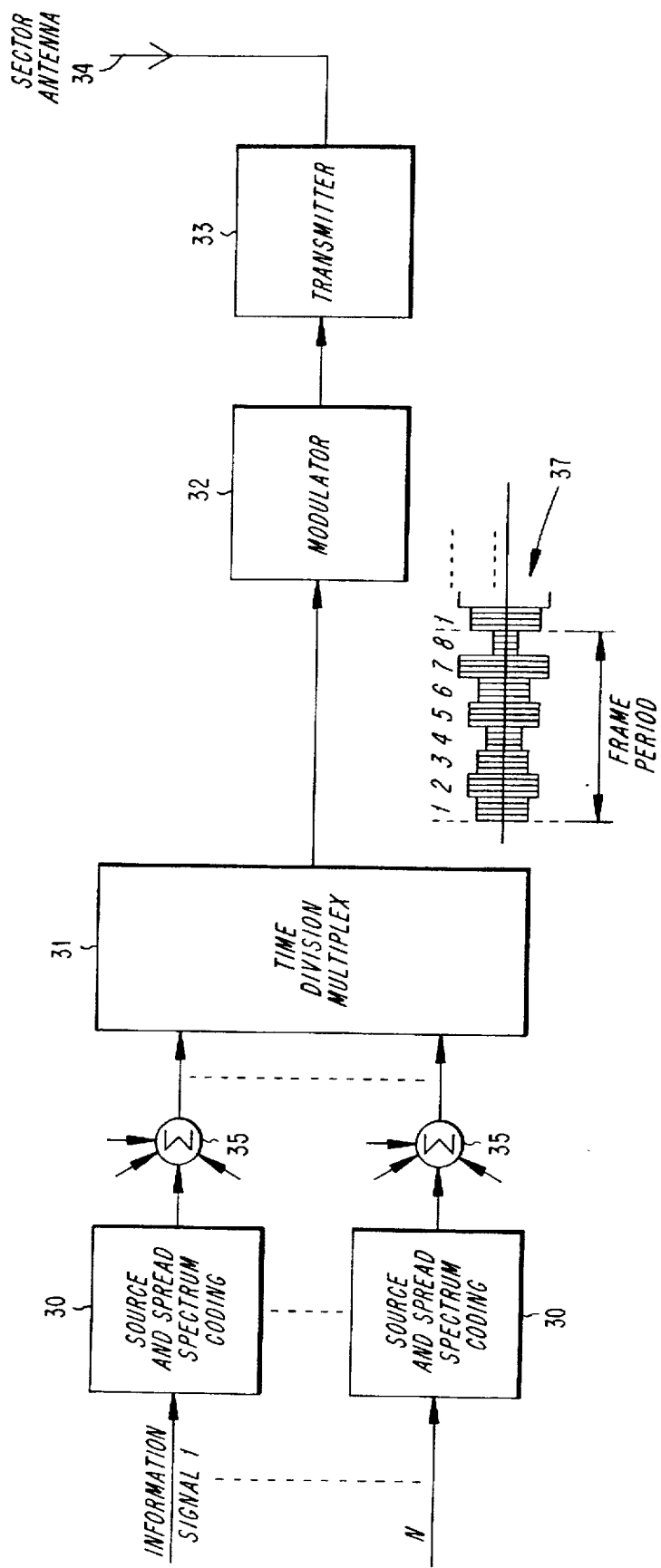
FIG. 8 shows an exemplary base station transmitter for transmission of multiple signals on different timeslots.

FIG. 8 shows the construction of an exemplary base station transmitter for use in a fixed base station network for transmitting multiple signals, each destined to be received by individual mobile or portable stations using the receiver of FIG. 4. FIG. 8 shows multiple source and spread spectrum units 30 numbered 1 to N which can each operate according to the description of FIG. 3. The outputs of each coder 30 are added with others in an adder 35 to form the composite signal to be transmitted in a given timeslot. The signals added in any one adder 35 are distinguished by having been spread spectrum coded using a distinct spread spectrum access code. The outputs of the adders 35 are fed to a time-division multiplexer 31 where they are time-compressed into their designated timeslots in a TDM frame period. The multiplexed output signal is then modulated onto a suitable radio frequency carrier using a modulator 32 and raised to a transmit power level by a transmitter 33 for transmission via an antenna 34. The antenna 34 may, for example, be one of three sectorized antennas arranged around an antenna mast such that each radiates energy in an approximately 120 degree sector. FIG. 8 also illustrates at 37 the appearance of a time-multiplexed and modulated signal having 8 timeslots, indicating that the power in each slot may be different.

A person skilled in the art will recognize that the output signals from the adders 35 are no longer necessarily binary or digital signals but may be multi-level or analog signals. Because it is simpler to time-compress digital or binary signals using a memory, a person skilled in the art will readily appreciate that the order of the adders 35 and time-multiplexer 31 may be reversed so that time-compression and multiplexing takes place on signals while they are in the digital domain, and then adders 35 can add the time-multiplexed signals in desired power ratios to form multi-level, time-multiplexed signals.

If the number of signals transmitted using the same spread-spectrum channel bandwidth is M, and the number of timeslots is N, then the number of overlapping signals in any one timeslot is M/N, the reduction by N removing one of the complexity factors normally making wideband spread-spectrum receivers undesirably complex and costly for mobile phone applications.

In certain applications an entire allocated band can be regarded as a single spread-spectrum channel and filled by using a sufficiently elevated chip rate and number of timeslots according to the invention. Where very large bandwidths of many tens of megahertz are available, however, it may be desirable to limit the chip rate and to divide the band into multiple spread spectrum channels. A theoretical advantage of direct sequence spread spectrum is to permit the use of every frequency channel in every cell or sector of the service area, even when such cells or sectors are geographically adjacent. Commonly owned U.S. patent application Ser. No. 08/497,022, by Dent, filed Jun. 30, 1995, entitled "Use of Diversity Transmission to Relax Adjacent Channel Requirements in Mobile Telephone Systems", which is hereby incorporated by reference, has pointed out the practical limitations of connecting transmitters using adjacent channels to the same antenna system, and has proposed novel solutions that also provide diversity transmissions.

Figure 9:
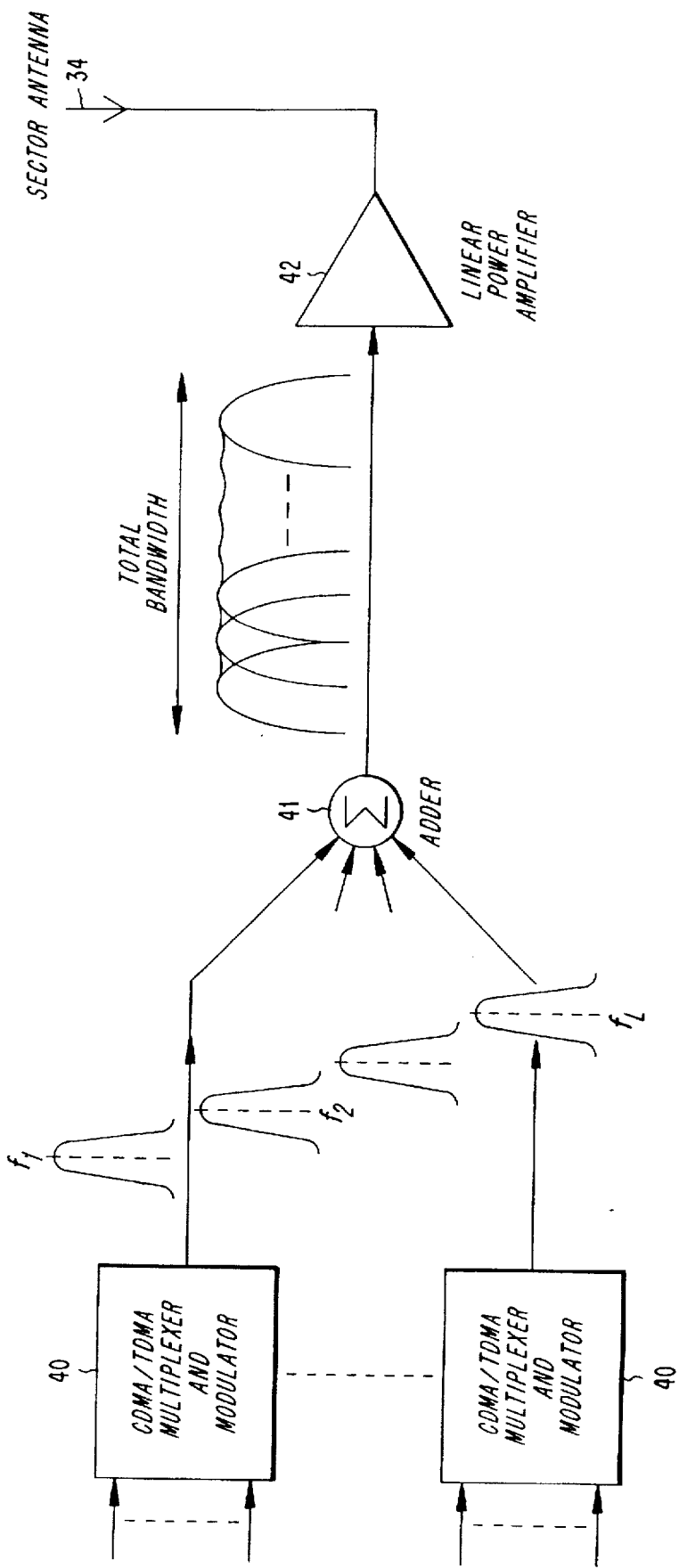
FIG. 9 shows an exemplary base station transmitter for transmission of multiple signals on different timeslots and different carrier frequencies.

FIG. 9 shows an exemplary transmitter using linear power amplifiers. Such a base station, in addition to transmitting multiple signals using different spread spectrum codes and timeslots, also uses multiple spread-spectrum frequency channels. In FIG. 9, a number of spread spectrum and time-division multiplexers (elements 30, 31 and 35 in FIG. 8) have been abbreviated to a single CDMA/TDMA multiplexer/modulator unit 40 in FIG. 9.

Each unit 40, numbered 1 to L, generates an N-timeslot CDMA signal centered on a separate channel frequency f1 . . . fL. The different frequency signals are added at a low power level in an adder 41, and then the composite signal is amplified to a high transmit power using a linear power amplifier 42 prior to transmission via an antenna 34, which may be a sector antenna.

According to this embodiment, a given signal for transmission, for example a telephone voice signal emanating from a subscriber in a Public Switched Telephone Network (PSTN) is allocated a certain CDMA access code, TDMA timeslot, and channel frequency to use. A transmission power level may also be allocated according to the distance of the receiving mobile station from the base station.

The incorporated references, and also U.S. Pat. Ser. No. 5,345,598, entitled "Duplex Power Control", which is also hereby incorporated by reference, disclose strategies for allocating transmission power levels as a function of spread spectrum code, channel frequency, and distance. When several channel frequencies are available, a disclosed strategy is to avoid allocating signals with high power requirements all to one frequency channel and those with low power requirements to another, but to maintain a more or less similar variety of signals of different power levels on each carrier frequency. This can be implemented by maintaining a list of graded signal power levels nominally expected on each carrier and whether those power levels are presently occupied or not. A newly appearing signal requiring a particular transmit power level would then be allocated a carrier on which that level was unoccupied.

When the additional dimension of timeslot is introduced, the same strategy as outlined above and in the incorporated references may be applied independently in each timeslot. Indeed, assuming different base stations are synchronized such that timeslots numbered 1 occur at the same time in neighboring base stations, it is possible to apply independent channel assignment strategies in different timeslots, as disclosed in commonly owned U.S. patent application Ser. No. 08/608,717, by Paul Dent, entitled "TIME-REUSE PARTITIONING SYSTEM AND METHODS FOR CELLULAR RADIO TELEPHONE SYSTEM" filed on Feb. 29,1996 and now U.S. Pat. No. 5,844,894 which is hereby incorporated by reference. One strategy that can be employed in a given timeslot, for example, is to preferentially allocate a signal to a frequency in which the surrounding base stations have a low traffic loading. This may be termed adaptive channel allocation.

A second approach that can be employed involves selecting at a base station a frequency channel, timeslot, and power level to be used for transmitting to each mobile a respective CDMA signal such that the power levels of signals selected to be transmitted using the same frequency and timeslot are spread over a desired dynamic range. The signals selected to be transmitted on the same frequency and timeslot can then be added together using weighting factors corresponding to the selected power levels of the CDMA signals to form a sum signal. The sum signal can then be time compressed for transmission in the selected timeslot and the time compressed signal modulated for transmission on the selected frequency channel.

With this exemplary strategy, the desired dynamic range can be set such that it defines a maximum allowable difference in power level between a highest power CDMA signal and a lowest power CDMA signal. The power levels can also be spread on a particular frequency such that each timeslot contains a substantially even distribution or mix of high and low power signals. The total transmitted power for each timeslot on the same frequency can be set to be substantially equal, and the total transmitted power on each frequency channel can be set to be substantially equal.

According to another exemplary embodiment, the total power transmitted on different frequency channels can be set such that a high total power is used on a frequency channel that has a low total power on the same frequency channel used in an adjacent cell, or vice versa. Other variations on this method are also possible, as will be recognized by those skilled in the art. For example, another approach which can be applied in a different timeslot is to allocate high power signals to frequency 1 at base station 1, medium power signals to frequency 1 at base station 2 and low power signals to frequency 1 at base station 3, where the three base stations are adjacent and form the vertices of a triangle. The allocation of power levels is then cyclically permuted at two other frequencies, with base station 2 using frequency 2 for high power signals, base station 3 using it for medium power signals and base station 1 using it for low power signals, and so on for frequency 3. In this way, the same frequency is not used for high power signals in two adjacent bases. This strategy is known in the art as "re-use partitioning".

A desirable strategy in the context of a base station according to FIG. 9, however, is to maintain a more or less equal power demand from the linear power amplifier 42 in all timeslots, so that no one timeslot requires an excessively high peak power while the available power is underused in another slot.

Figure 10:
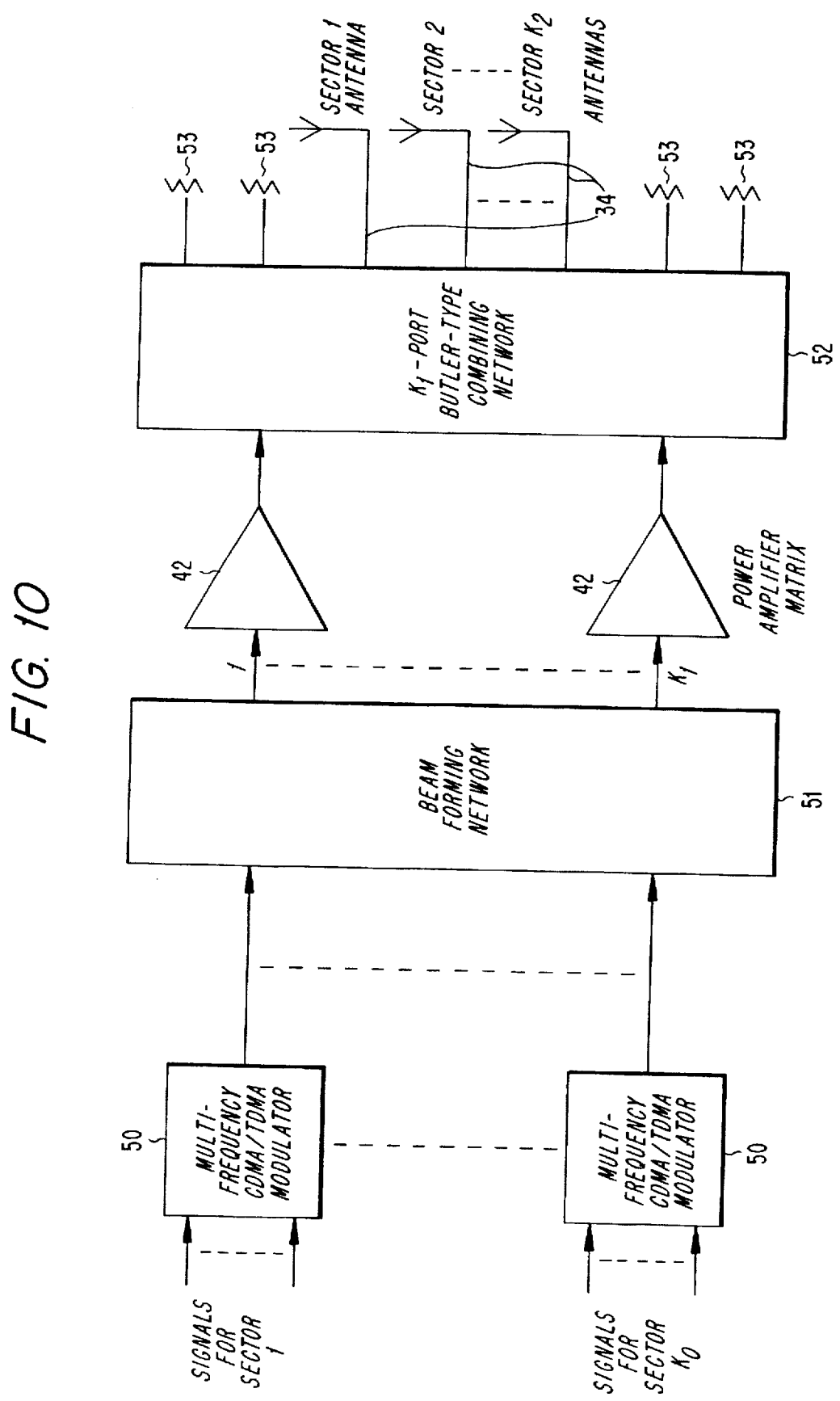
FIG. 10 shows an exemplary base station for transmitting multiple signals on multiple timeslots and multiple carrier frequencies and in different directions.

FIG. 10 shows another exemplary base station design suitable for increased communications capacity. A number K0 of multi-frequency, multi-timeslot CDMA/TDMA signal generators 50 are shown, each according to the CDMA/ TDMA multiplexer/modulator unit 40 and the adder 41 of FIG. 9. The wideband output signal from each unit 50 is desired to be radiated in one of H0 principal directions with the aid of K2 sector antennas 34. K2 may be less than H0 and the greater number of directions is effectively obtained using a beamforming network 51 which interpolates between the K2 axes formed by physical antenna elements 34.

More details of beam interpolation by this method are described in commonly owned copending U.S. application Ser. No. 08/179,953, entitled, "A Cellular/Satellite Communications System with Improved Frequency Re-use", filed Jan. 11, 1994, which is hereby incorporated by reference. It is described therein that in general, the total signal received by a mobile can be described as the sum of a number of components, each component representing a signal from a different antenna element. Conversely, the signals received by an antenna element can be described as the sum of a number of components, each component representing a signal from a different mobile. Beam signals B received at a particular antenna element can thus be related to the signals M transmitted by the mobiles through the matrix equation B=C·M where C is a matrix of complex numbers Cki which represent the attenuation and phase shift of the signal transmitted from mobile i as it is received at antenna element k. A signal Mi transmitted from mobile i would thus be received in an amount Cki·Mi at antenna element k. The matrix C above may be referred to as a "receive C-matrix" since it is multiplied by M to obtain the beam B received by the base station. Likewise, a "transmit C-matrix" may be formed to correlate the beam B transmitted from an antenna element of the base station to the signal received at the mobile station.

As described in more detail in the above-incorporated U.S. patent application Ser. No. 08/179,953, the elements Cki of the transmit and receive C-matrices can be calculated by:

1) correlating the signal received from a new mobile during its random access transmission with the individual antenna beam element signals to determine a new column of coefficients for the receive C-matrix;

2) determining a new inverse C-matrix for receiving traffic from the new mobile based on the old inverse C-matrix and the new column;

3) transforming the new receive C-matrix column to a new transmit C-matrix row; and 4) determining a new transmit inverse C-matrix based on the old transmit C-matrix and the new row.

According to one exemplary method, the signals received in the different antenna beams are sampled at the same time at a rate sufficient to capture all signal components of interest according to Nyquist's criteria. One set of such samples forms the column vector B at any instant, and each such vector is multiplied by the inverse of the receive-C matrix, for example, once per sample period to obtain a set of samples M representing interference-free mobile signals. Successive values of the same element of M form the sample stream corresponding to one mobile signal. This stream is fed to a digital signal processor for each mobile signal which turns the sample stream into, for example, an analog voice waveform or 64 KB PCM digital voice stream as required by the telephone switching system to which the system is connected.

This type of matrix processing can be implemented so that each mobile phone receives only its own signal, the intra-cell interference from other signals having been cancelled by the addition in the matrix processor of compensating amounts of opposite sign as determined by the transmit-C matrix coefficients. In addition, the above-incorporated application provides methods for reducing the effects of Rayleigh fading and multi-path propagation.

The beam forming network 51 produces drive signals for H1 linear amplifiers of the type designated by element 42 in FIG. 4, where the number H1 can advantageously be larger than K2 but can be smaller than H0. The amplifier outputs are connected to the H1 input ports of a passive combining network, for example a network of the type known as a Butler matrix, and K2 of the combining network's outputs are connected to respective ones of the K2 antennas, while the remaining H1-K2 outputs are terminated in dummy loads.

It is disclosed in commonly owned U.S. patent application Ser. No. 08/179,947, entitled "Waste Energy Control Management for Power Amplifier", filed Jan. 11, 1994, which is also hereby incorporated by reference, that the characteristics of intermodulation generated by non-linearities in a matrix power amplifier are different than in a single amplifier. It can be shown that third order intermodulation between signals input respectively to inputs I and J of the input Butler matrix appears on the output numbers $(2i-j)_N$ and $(2j-i)_N$ of the output Butler matrix. As a first step to reducing intermodulation in a matrix power amplifier, one embodiment of the present invention provides an excess number of amplifying paths so that outputs $(2i-j)$ or $(2j-i)$ or their corresponding inputs are not used for desired signal outputs, but are terminated in dummy loads. Thus, third order modulation between signals i and j will not be transmitted. This requires that the number of Butler matrix input and output ports M be greater than the number of signals to be amplified N, wherein the remaining M-N signals are terminated in dummy loads.

It is easy to see that if only two signals are to be amplified, then using ports 1 and 2 as inputs and outputs will result in third order intermodulation appearing on ports 0 and 3, which are terminated. It is not so obvious how to achieve this when many signals are present. This problem is however solved by Babcock in another context. Babcock wanted to find a method of allocating frequency channels on an equally spaced grid to signals amplified by the same non-linear amplifiers such that third order intermodulation between any two or three signals would not fall in a channel used by a signal. The mathematical formulation of the problem is the same as for the inventive matrix power amplifier, wherein a set of integers is found I1, I2, I3 . . . such that Ii+Ik-Ij is not in the set. The solution is called "Babcock spacing". Babcock applied these integers to choosing among M frequency channels for the transmission of signals. However, the present invention applies Babcocks integer sets to choosing among M physical output channels which are used for N desired signals. Consequently, an improvement over a conventional matrix power amplifier is to employ a larger matrix than the number of signals to be amplified, and to allocate input and outputs to signals or not according to the Babcock spacing or other optimum allocation, thus insuring that intermodulation emerges principally from outputs that are not allocated to signals.

Thus, the use of a matrix power amplifier (PA) having a greater number of PA devices than antenna outputs can result in diversion of distortion products to the dummy loads 53 with resulting improvement in quality and linearity of the radiated signals. In particular, when H1 is greater or equal to 2 times K2, all distortion products can in theory be diverted to the dummy loads 53 and not radiated.

A further benefit of the matrix PA in the context of the present invention is the averaging of the power loading of each of the PA devices 42 over many sectors and frequencies, such that differences in loading in any particular timeslot and frequency would be of reduced significance. This facilitates the reservation of a particular timeslot, which may be permuted between different frequencies and sectors, to handle only the highest power transmissions associated with call initiation, as disclosed in U.S. Pat. Ser. No. 5,295,152, entitled "TDMA for Mobile Access in a CDMA System", which is hereby incorporated by reference. The latter invention is particularly useful in avoiding random access transmissions made at a high power level interfering with ongoing communications.

The variations in receiver architectures for multiple-signal base stations can follow the same pattern as FIGS. 3, 8, 9 and 10 for transmitters, with reversal of the direction of signal flow. For brevity, only an exemplary receiving station analogous to the transmitter architecture of FIG. 10 is illustrated in FIG. 11, as this contains all the techniques and components which may be individually omitted to form receiver architectures reciprocally related to the transmitter architectures of FIGS. 3, 8 and 9.

Figure 11:
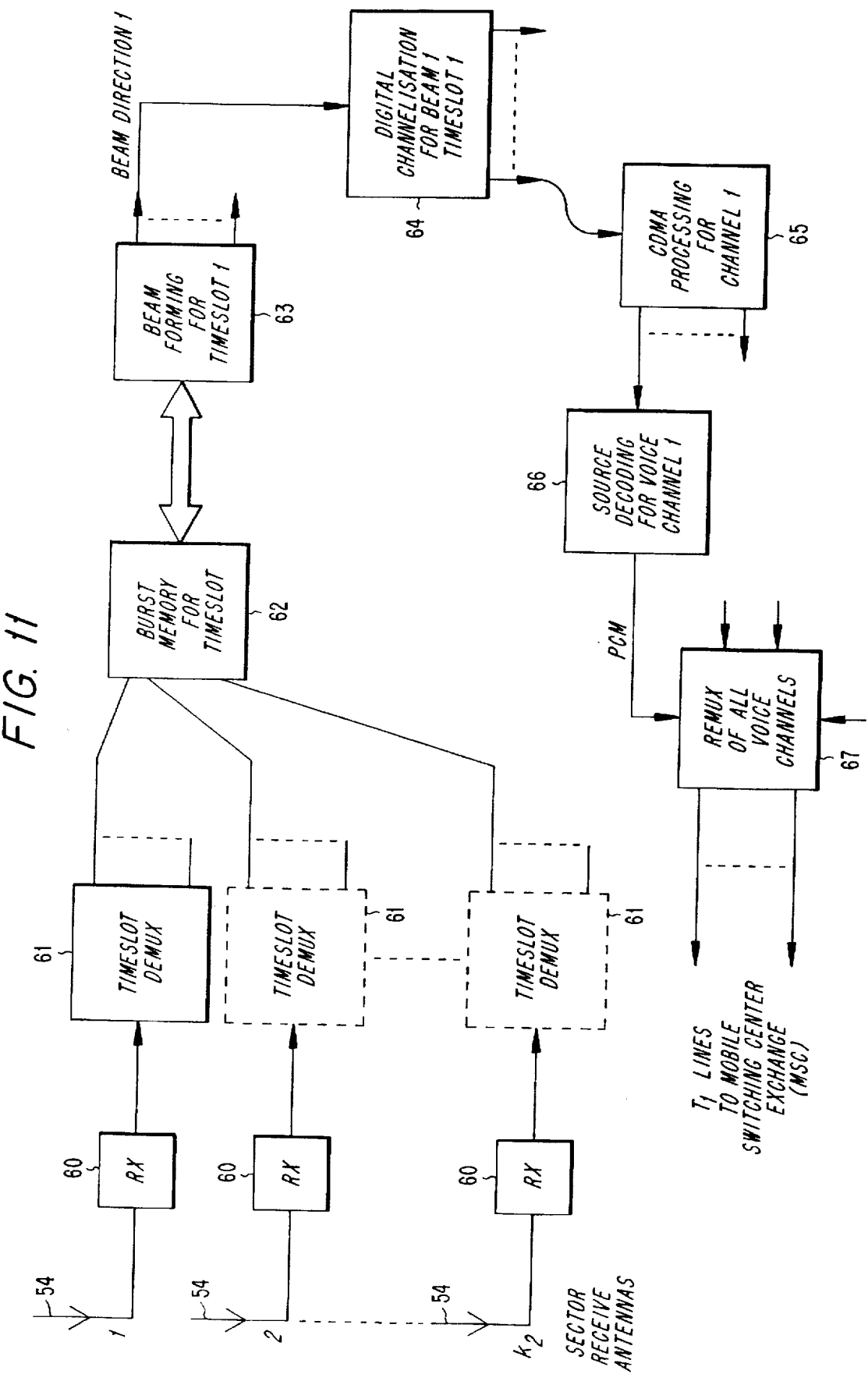
FIG. 11 shows an exemplary receiving station for receiving multiple signals on different timeslots, different frequencies, and from different directions.

As shown in FIG. 11, an exemplary multi-channel receiver includes a number of sector antenna elements 54 connected to respective wideband digitizing receiver channels 60. Each receiver is preferably activated during an allocated timeslot or timeslots in which a time compressed burst is received, which results in reduced power consumption for the receiver. Each receiver 60 preferably receives, filters, amplifies and digitizes the entire allocated bandwidth using high-speed, complex AtoD convertors. The digital output of receivers 60 is then decimated by a TDMA demultiplexer 61 into numerical sample blocks corresponding to each timeslot. The samples for corresponding timeslots from all sector antennas are available simultaneously in a burst memory 62, from which they are recalled by a beamforming processor 63 which forms combinations of the signals from each antenna element 54, each combination corresponding to a different direction of reception. The combination corresponding to a particular direction of reception is then further processed in a digital channelization processor 64 to separate out signals on different channel frequencies received from that direction in that timeslot. CDMA processors 65,which are preferably Subtractive CDMA processors, may then be used to process the composite CDMA signal present on each channel frequency in order to resolve the information stream transmitted by each particular mobile or portable station.

The information stream for a particular mobile is then source decoded by a source decoder 66 to reconstruct analog voice or, more usefully, a PCM representation of the transmitted voice, fax or data signal in a format compatible with the digital public switched telephone network (PSTN). For example, the reconstruction can include transcoding digitally coded voice information from ADPCM, RELP, CELP, VSELP, or sub-band to standard U-Law or A-Law PCM format for interfacing with the PSTN. Finally, all such PCM signals are remultiplexed using remultiplexer 67 into a standard PCM multiplex format such as T1 lines together with control channel signals such as Fast or Slow Associated Control channel signals for transmission by landline or microwave link to a mobile switching center (MSC).

Alternatively, the final step of transcoding digitally compressed speech in RELP, VSELP, or other of the above-mentioned formats to PCM format can be omitted and that step performed nearer the terminal destination of the information in order to reduce long-distance transmission costs. The final conversion to PCM or analog voice waveforms may then be performed in a so-called mobile communications Gateway exchange, preferably the Gateway nearest the calling or called PSTN subscriber.

A person skilled in the art will appreciate that the order of decimation of the total signal energy received at a base station site into individual signals distinguished by timeslot, direction, frequency, and CDMA code can be done in an order different from that used for the purposes of illustration in FIG. 11. For example, the digital channelization can be performed before beamforming. A beamformer is then used per frequency channel, but this can be the same beamformer employed iteratively using different beamforming coefficients for each frequency channel. Likewise, frequency channel separation can be performed before timeslot decimation, a demultiplexer 61 then being supplied for each frequency. However, once received signals have been digitized and conveyed to memory, it is largely immaterial which of these processes are performed first, a similar amount of processing power being required in all cases related to the total capacity of the station measured in voice channels. However, there can be practical implementation advantages in choosing one order of decimation over another due to the different states of the art in constructing high speed time decimation circuits compared to digital frequency decimation circuits or beam forming computers. Any variation of the processing order to facilitate practical realization at a given point in the evolution of technology is deemed to fall within the scope and spirit of the invention.

Since the present invention can be applied to any type of radiocommunication system, the particular base station or mobile station structure is not particularly germane to this discussion. For purposes of completeness, however, a brief summary of exemplary structures will now be provided. Those skilled in the art will readily appreciate that other base station and/or mobile station configurations could also be used.

FIG. 12 represents a block diagram of an exemplary cellular mobile radiotelephone system according to one embodiment of the present invention which can be used to implement the foregoing. The system shows an exemplary base station 160 and a mobile 170. The base station includes a control and processing unit 162 which is connected to the MSC 165 which in turn is connected to the public switched telephone network (not shown).

The base station 160 for a cell includes a plurality of voice channels handled by voice channel transceiver 164 which is controlled by the control and processing unit 162. Also, each base station includes a control channel transceiver 166 which may be capable of handling more than one control channel. The control channel transceiver 166 is controlled by the control and processing unit 162. The control channel transceiver 166 broadcasts control information over the control channel of the base station or cell to mobiles locked to that control channel. This control information can include the OMTs and CFs as described above.

When the mobile 170 first enters the idle mode, it periodically scans the control channels of base stations like base station 160 to determine which cell to lock on or camp to. The mobile 170 receives the absolute and relative information broadcast on a control channel at its voice and control channel transceiver 172. Then, the processing unit 174 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A communication method using Code Division Multiple Access comprising the steps of:

assembling information into blocks of digital data;

coding the blocks of digital data to form spread spectrum codewords;

adding at least two of the spread spectrum codewords to form a composite signal; and time-compressing the composite signal for transmission in a timeslot.

2. The communication method of claim 1, further comprising the step of scrambling the spread spectrum codewords.

3. The communication method of claim 1, further comprising the step of selectively activating a receiver to receive the time-compressed composite signal during a selected time slot.

4. The communication method of claim 1, further comprising the steps of:

receiving the time-compressed composite signal;

determining a signal strength order corresponding to the spread spectrum codewords contained in the composite signal; and decoding the spread spectrum codewords in order of greatest to smallest signal strength and subtracting the spread spectrum codewords from the composite signal.

5. A method of communicating using Code Division Multiple Access comprising the steps of:

coding information into digital form to produce a sequence of coded bits;

assembling the coded bits into blocks;

redundantly coding the blocks to form spread spectrum codewords;

scrambling the spread spectrum codewords to form scrambled codewords;

adding at least two of the scrambled codewords to form a composite signal and time compressing the composite signal for transmission in an allocated timeslot.

6. A method of communicating using Code Division Multiple Access comprising the steps of:

coding information using spread spectrum codewords for transmission in an allocated timeslot;

enabling a receiver during the allocated timeslot to receive a composite signal comprising the spread spectrum codewords and an interfering signal;

converting the composite signal into a sequence of numerical samples and storing the numerical samples in a memory;

correlating the numerical samples with one of the spread spectrum codewords at least two points shifted in time to determine numerical values related to a phase and an amplitude of at least two multipath rays;

identifying the spread spectrum codewords using the numerical values to produce a symbol sequence;

reconstructing the information using the symbol sequence.

7. The method of claim 6, wherein said reconstructing step comprises error correction decoding.

8. The method of claim 7, wherein the error correction decoding is carried out with a Reed-Solomon decoder.

9. The method of claim 7, wherein the error correction decoding comprises convolutional decoding.

10. The method of claim 6, wherein the reconstructing step comprises digital voice decoding using at least one of Residual Excited Linear Predictive Coding, Sub-band, and Vector Code Book Excited Linear Predictive Coding speech decoding to produce an analog speech waveform.

11. The method of claim 6, wherein the reconstructing step includes transcoding digitally coded voice from at least one of Adaptive Delta Pulse Code Modulation, Residual Excited Linear Predictive Coding, Sub-band, and Vector Code Book Excited Linear Predictive Coding format to at least one of standard U-Law and A-Law Pulse Code Modulation format for interfacing with a public switched telephone network.

12. A communication apparatus comprising:

block spreading means for assembling digital information into blocks and coding the blocks to produce spread spectrum codewords;

timing means for allocating a timeslot in a repetitive frame period for transmission of the spread spectrum codewords; and burst formatting means for selecting at least two of the spread spectrum codewords and for time-compressing the at least two of the spread spectrum codewords for transmission in the allocated timeslot.

13. The communication apparatus of claim 12, further comprising scrambling means for combining the spread spectrum codewords with an access code to form scrambled spread spectrum codewords.

14. An apparatus for communicating information signals using Code Division Multiple Access between a fixed station and a mobile station comprising:

spread spectrum coding means for coding the information signals to form spread spectrum codewords;

a transmitter for transmitting a transmitted signal comprising at least two of the spread spectrum codewords during an allocated timeslot;

timing control means for enabling a receiver during the allocated timeslot to receive a composite signal comprising the transmitted signal and interfering signals; an analog to digital converter for converting the composite signal into a sequence of numerical samples;

a memory for storing the numerical samples;

processing means for recalling the numerical samples from the memory and for processing the numerical samples to establish numerical values related to a phase and an amplitude of at least two rays of the transmitted signal;

a decoder for reproducing the information signals based on the numerical values.

15. The apparatus of claim 14, wherein the spread spectrum coding means is located at the fixed station and the memory is located at the mobile station.

16. The apparatus of claim 14, further comprising source coding means which includes at least one of Adaptive Delta Pulse Code Modulation, Residual Excited Linear Predictive Coding, Sub-band, and Vector Code Book Excited Linear Predictive Coding speech coding means.

17. The apparatus of claim 14, further comprising at least one of convolutional error correction coding means, Reed-Solomon error correction coding means, bit time interleaving means, and symbol time interleaving means.

18. The apparatus of claim 14, wherein the spread spectrum coding means comprises at least one of orthogonal block spreading means, bi-orthogonal block spreading means, and chipwise modulo-2 adding means for scrambling the spread spectrum codewords using an access code.

19. A receiver comprising:
   an antenna for receiving a composite signal, the composite signal comprising at least two spread spectrum codewords which are time-compressed into a timeslot;
   radio receiver means connected to the antenna for filtering and amplifying the composite signal received by the antenna and for converting the composite signal into complex numerical samples;
   timing control means for activating the radio receiver means during the timeslot to thereby reduce power consumption;
   a memory for storing the complex numerical samples converted during the timeslot; and
   processing means coupled to the memory for processing the stored complex numerical samples, the processing means comprising:
      prediction means for predicting a signal strength of each of said spread spectrum codewords and for ordering the spread spectrum codewords in order of strongest to weakest signal strength; and
      iterative decoding means for decoding a strongest of the spread spectrum codewords and for subtracting the strongest of the spread spectrum codewords from the composite signal before decoding a next strongest of the spread spectrum codewords.

20. The receiver of claim 19, wherein the processing means comprises a Fast Walsh Transform circuit.

21. The receiver of claim 19, wherein the iterative decoding means subtracts the spread spectrum codewords by setting to zero a transform component computed from the complex numerical samples.

22. The receiver of claim 19, wherein the iterative decoding means subtracts the spread spectrum codewords by despreading the spread spectrum codeword to produce a narrowband signal and removing the narrowband signal with at least one of a notch filter and a bandstop filter.

23. The receiver of claim 19, wherein:
   the prediction means predicts the signal strength of individual rays of the composite signal, the rays being received via relatively delayed paths, and orders the rays in order of strongest to weakest signal strength, the signal strength being determined by computing a total energy of the rays of a particular spread spectrum codeword; and
   wherein the iterative decoding means subtracts rays of already decoded signals until a predetermined spread spectrum codeword is decoded.

24. A receiver for receiving and decoding information signals comprising:
   multiple-element antenna means for receiving and resolving signals from different directions;
   multiple-channel processing means, connected to the antenna means, for filtering, amplifying, and digitizing a portion of the received information signals to produce sequences of complex numbers for storage in a memory;
   multi-dimensional decimating means for processing the stored sequences of complex numbers to separate the information signals according to channel frequency, time of arrival, and direction of arrival and for producing numerical sequences representative of overlapping Code Division Multiple Access signals;
   CDMA signal processing means for processing the numerical sequences to separate individual channel signals transmitted by a single transmitter to produce information symbols; and
   source decoding means for processing the information symbols to reconstruct the information signals transmitted by the individual transmitter.

25. The receiver of claim 24, wherein the CDMA signal processing means iteratively decodes the CDMA signals in descending order of received signal strength.

26. The receiver of claim 24, wherein the source decoding means is located at a remote mobile communications gateway exchange and information signals are transmitted to the remote mobile communications gate exchange via a public switched telephone network.

27. A method of communicating using Code Division Multiple Access, comprising the steps of:
   forming a narrowband CDMA signal by combining information signals with an access code;
   time-compressing the narrowband CDMA signal to form a wideband CDMA signal;
   transmitting the wideband CDMA signal in a time-compressed burst.

28. The method of claim 27, further comprising the steps of:
   receiving the time-compressed burst and time expanding the time-compressed burst to reform a narrowband CDMA signal; and
   processing the restored narrowband CDMA signal to restore the information signals.

29. A method of communicating between at least one first station and plurality of second stations using Code Division Multiple Access including:
   selecting at said first station a frequency channel, timeslot and power level to be used for transmitting to each of said second stations a respective CDMA signal such that the power levels of signals selected to be transmitted using the same frequency and timeslot are spread over a predetermined dynamic range;
   adding together said CDMA signals selected to be transmitted on the same frequency and timeslot using weighting factors corresponding to the selected power levels of the CDMA signals to form a sum signal;
   time-compressing said sum signal for transmission in the selected timeslot and modulating the time-compressed signal for transmission on the selected frequency channel.

30. The method of claim 29, wherein said predetermined dynamic range defines a maximum difference in power level between a highest power CDMA signal and a lowest power CDMA signal.

31. The method of claim 29, wherein the power levels are spread such that each timeslot contains a substantially even distribution of low and high power signals.

32. The method of claim 29, wherein in each timeslot on the same frequency channel, a total transmitted power is substantially equal.

33. The method of claim 32, wherein on each frequency channel, the total transmitted power is substantially equal.

34. The method of claim 29, in which said first station is a base station serving a cell in a cellular mobile communications network.

35. The method of claim 29, wherein a first base station in a first cell transmits a relatively high total transmitted power on a first frequency, and a second base station in a second cell adjacent to the first cell transmits a relatively low total transmitted power on the first frequency.

* * * * *